United States Patent [19]

Wakabayashi et al.

[11] Patent Number: 5,461,704
[45] Date of Patent: Oct. 24, 1995

[54] ACCESSORY CONTROL DEVICE AND THE INFORMATION PROCESSING DEVICE AND INFORMATION PROCESSING METHOD THAT IT USES

[75] Inventors: Kenichi Wakabayashi; Chitoshi Takayama; Tadashi Shiozaki, all of Suwa, Japan

[73] Assignee: Seiko Epson Corporation, Japan

[21] Appl. No.: 910,851

[22] Filed: Jul. 7, 1992

[30] Foreign Application Priority Data

Mar. 2, 1992 [WO] WIPO ............... PCT/JP92/00247

[51] Int. Cl.⁶ .................................................. G06F 15/20
[52] U.S. Cl. ............................................. 395/114; 395/115
[58] Field of Search ................................. 395/115, 114, 395/112, 162

[56] References Cited

U.S. PATENT DOCUMENTS 5,131,078  7/1992  Ikenoue ........................ 395/114
5,185,853  2/1993  Cheng et al. .................. 395/115
5,228,118  7/1993  Sasaki ........................... 395/114
5,276,799  1/1994  Rivshin ......................... 395/162
5,293,466  3/1994  Bringmann .................... 395/114

*Primary Examiner*—Mark R. Powell
*Assistant Examiner*—Steven P. Sax

[57] ABSTRACT

An accessory control device for installation in an electronic apparatus, provided with a setting memory that stores various settings for the electronic apparatus, thus facilitating switching of settings during installation and removal of the accessory control device. Parameters such as those for communication with a workstation, number of copies to be made, and other settings in a laser printer are normally stored in EEPROM in the printer. When the accessory control device, in the form of a cartridge, is installed, a microprocessor in the cartridge stores settings from the printer in the EEPROM. Therefore, settings in the EEPROM are stored, and when the cartridge is removed, the printer immediately operates according to its original settings.

13 Claims, 18 Drawing Sheets

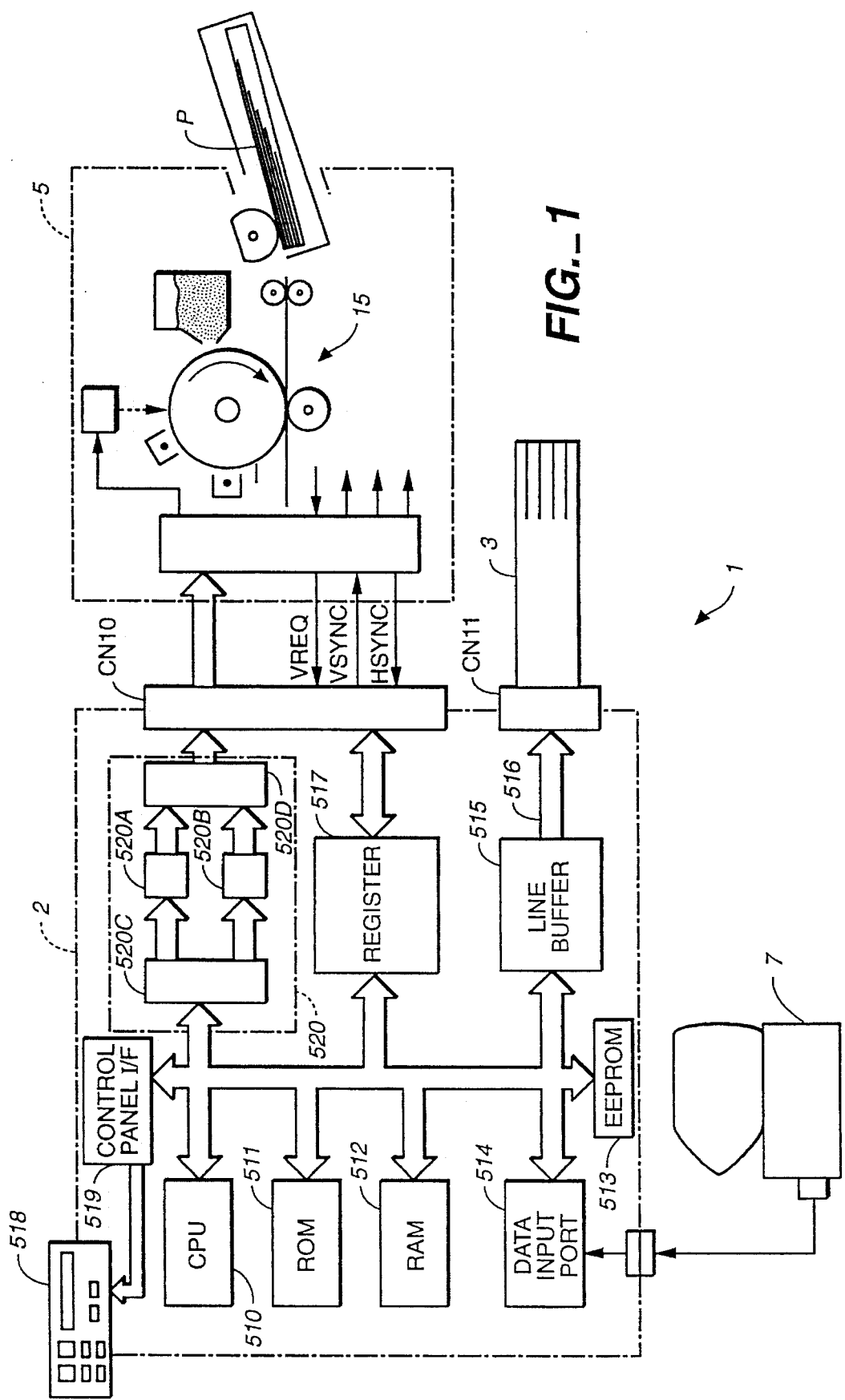
FIG._1

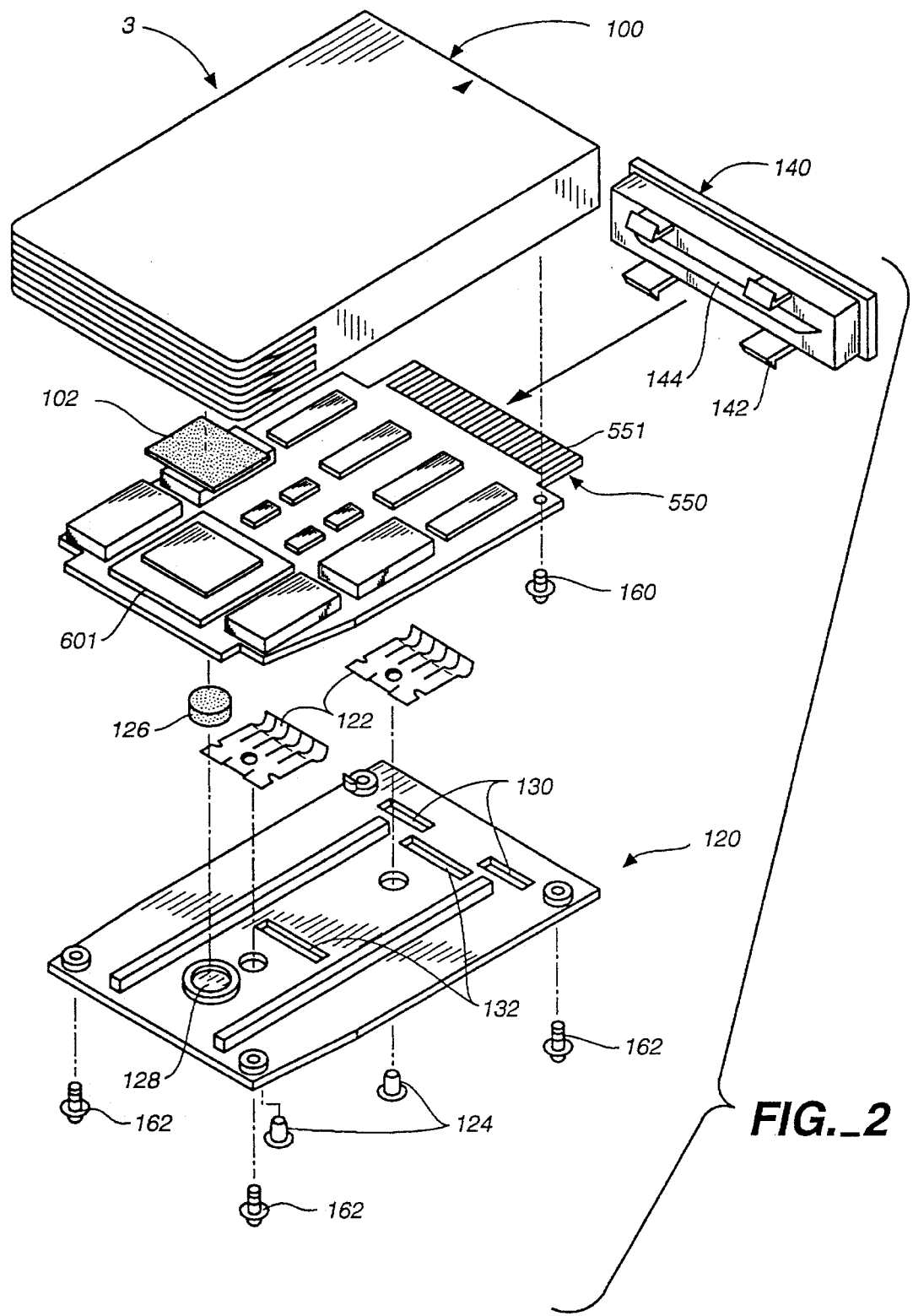
FIG._2

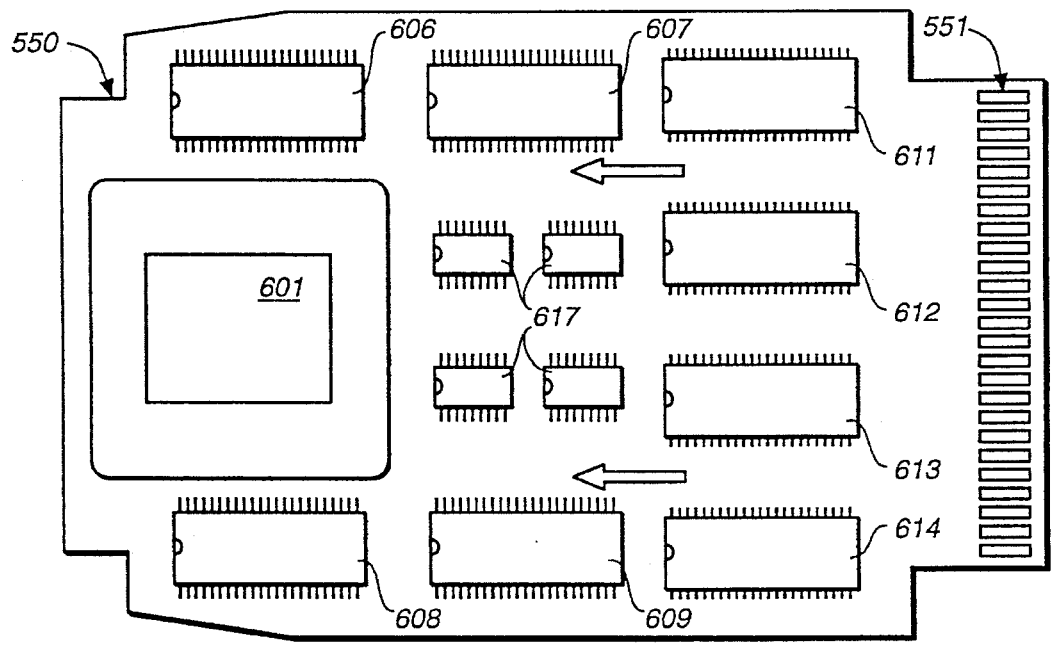
FIG._3A
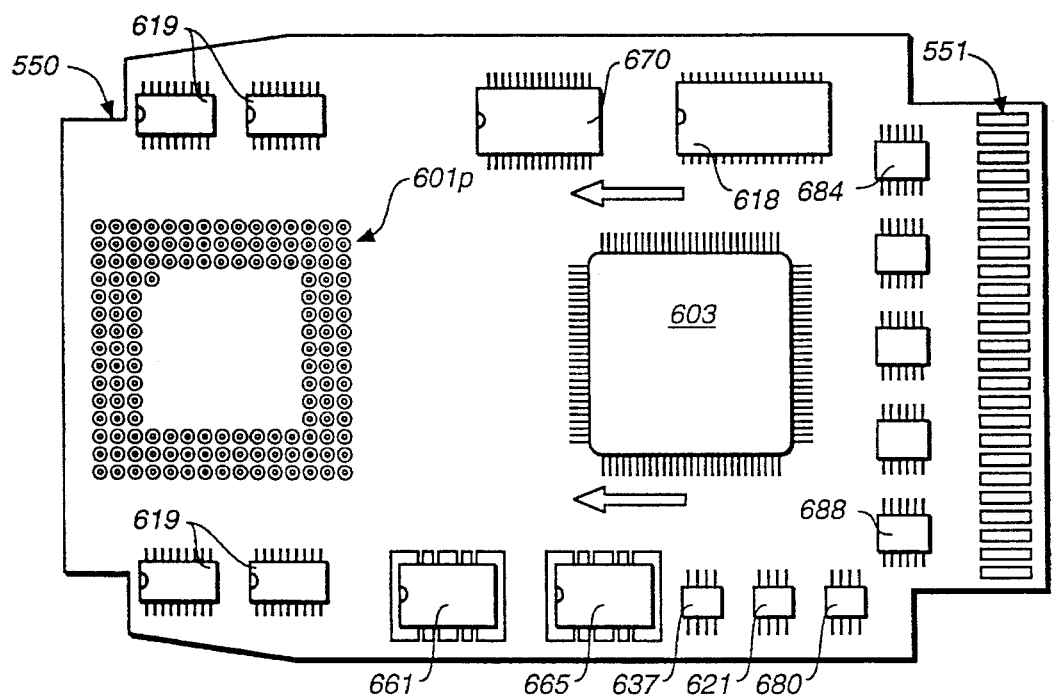
FIG._3B

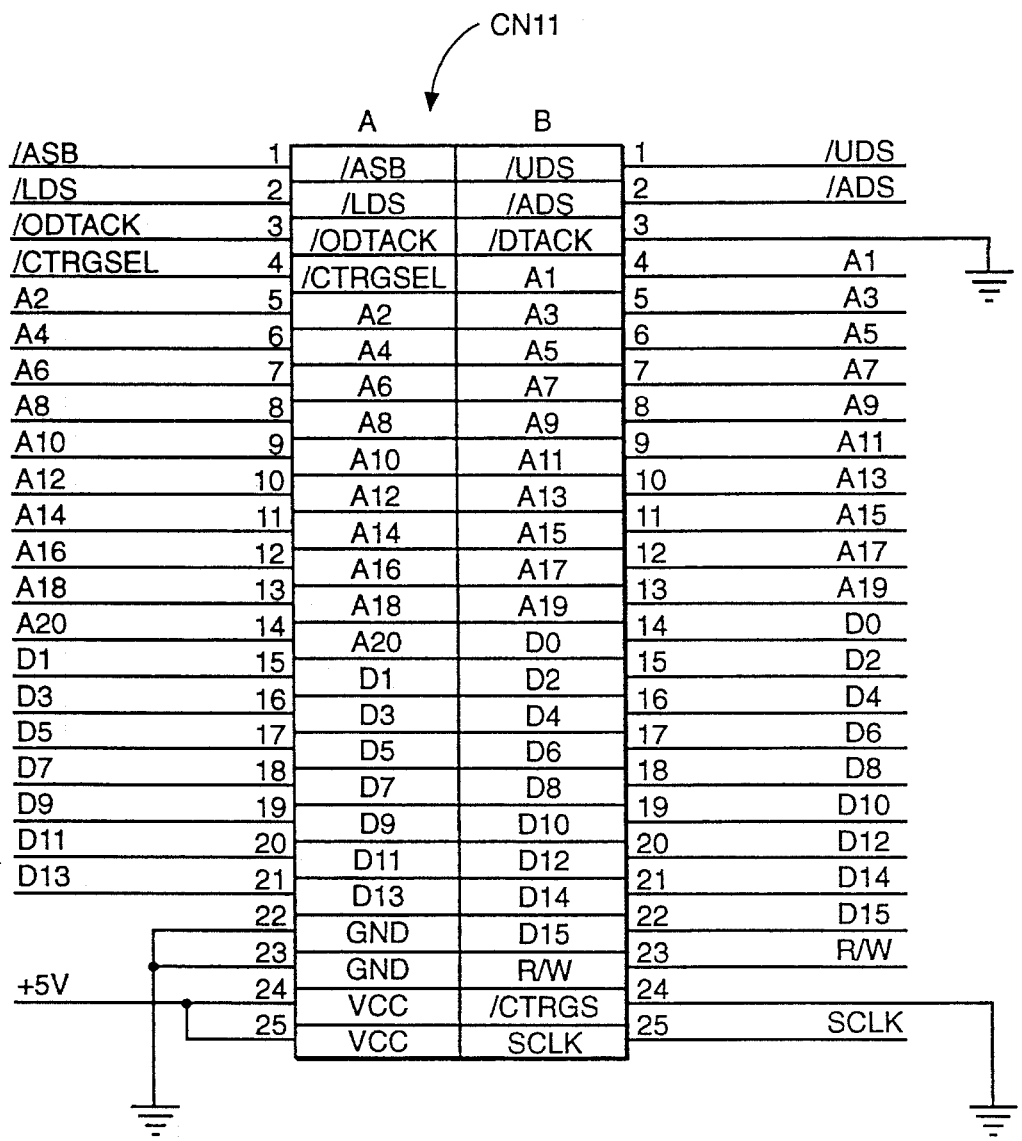
FIG._4
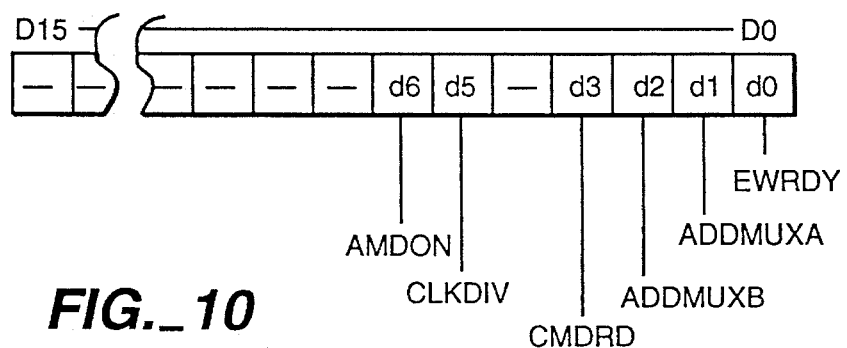
FIG._10

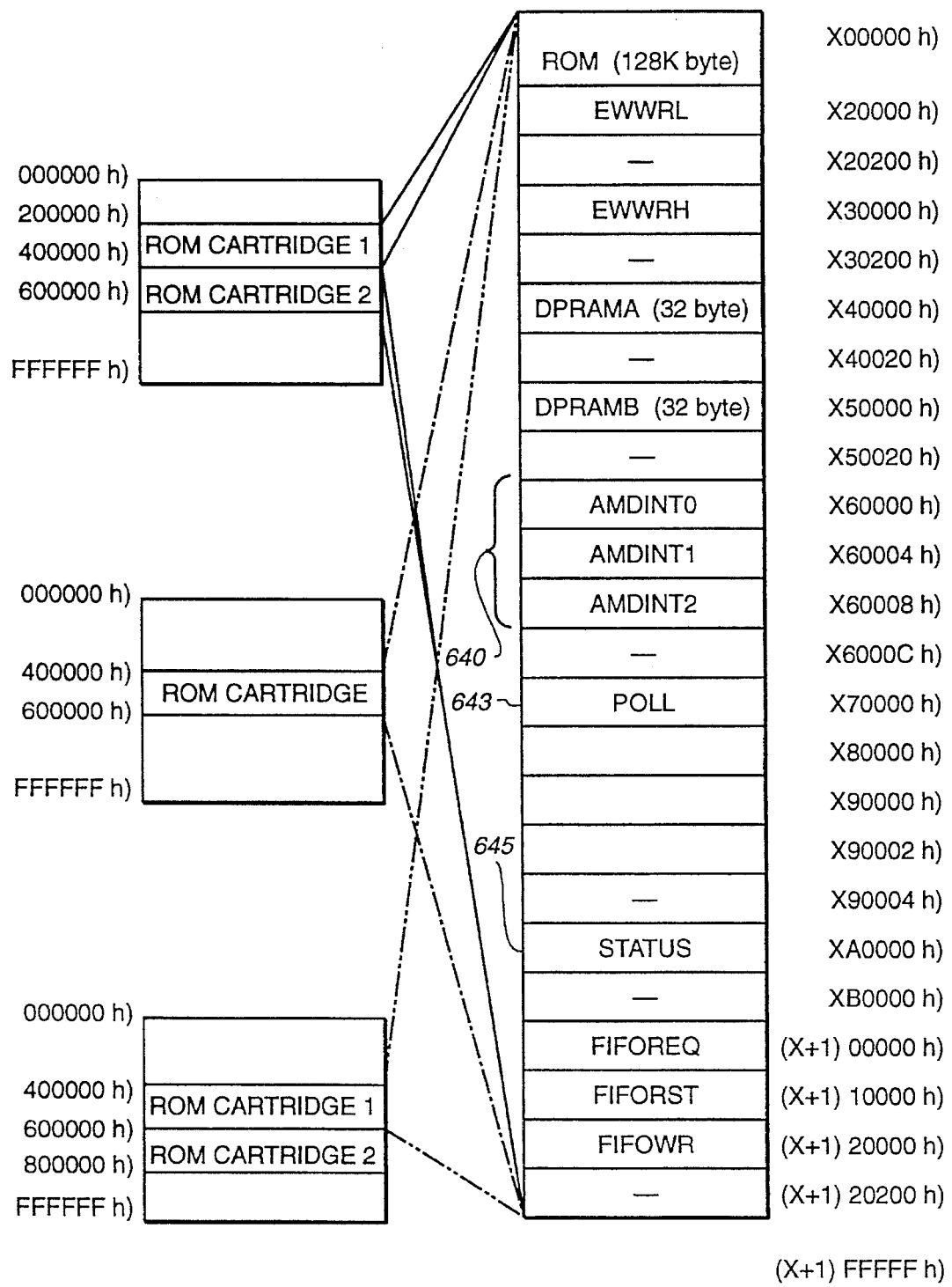
FIG._5

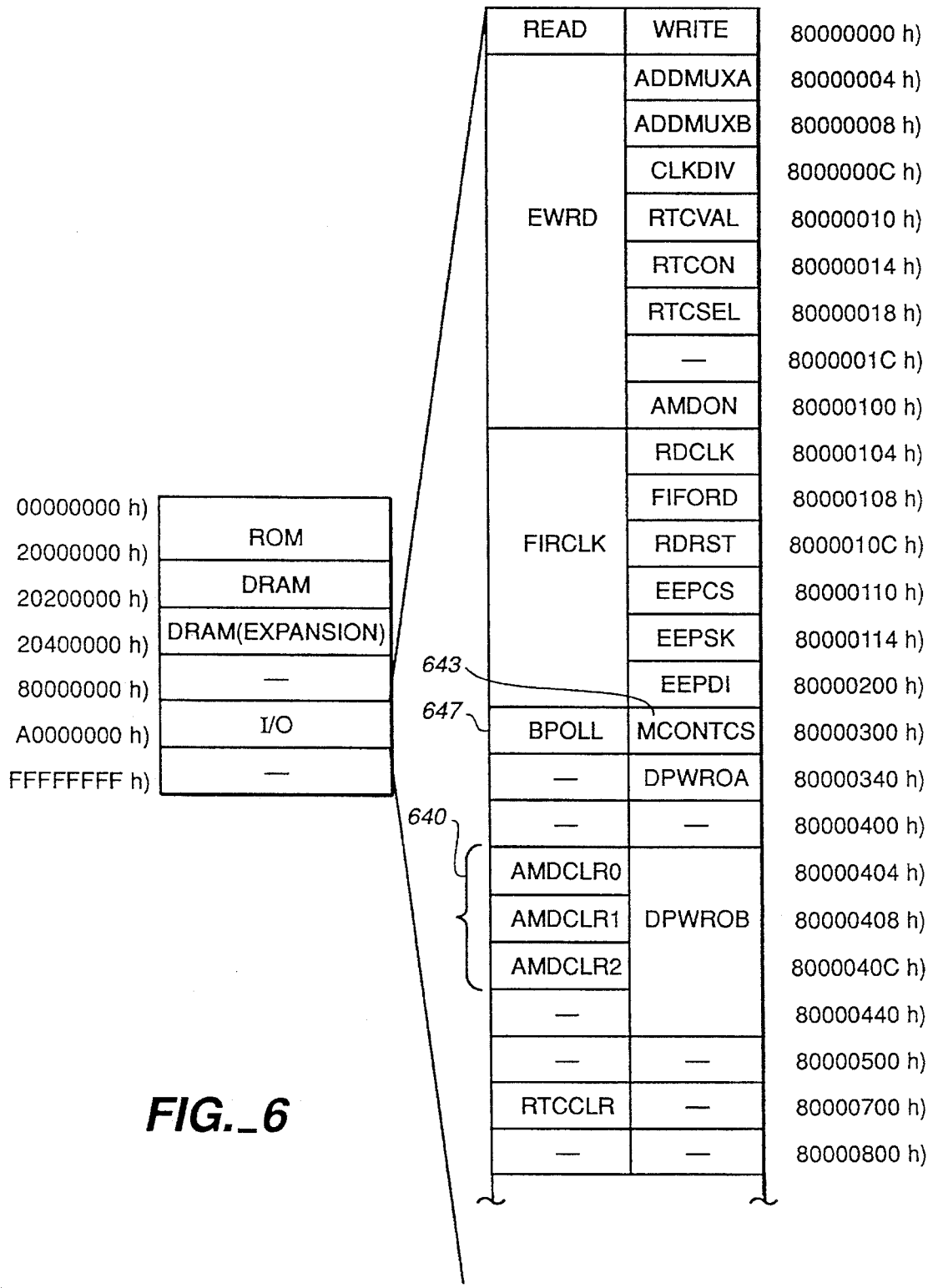
FIG._6

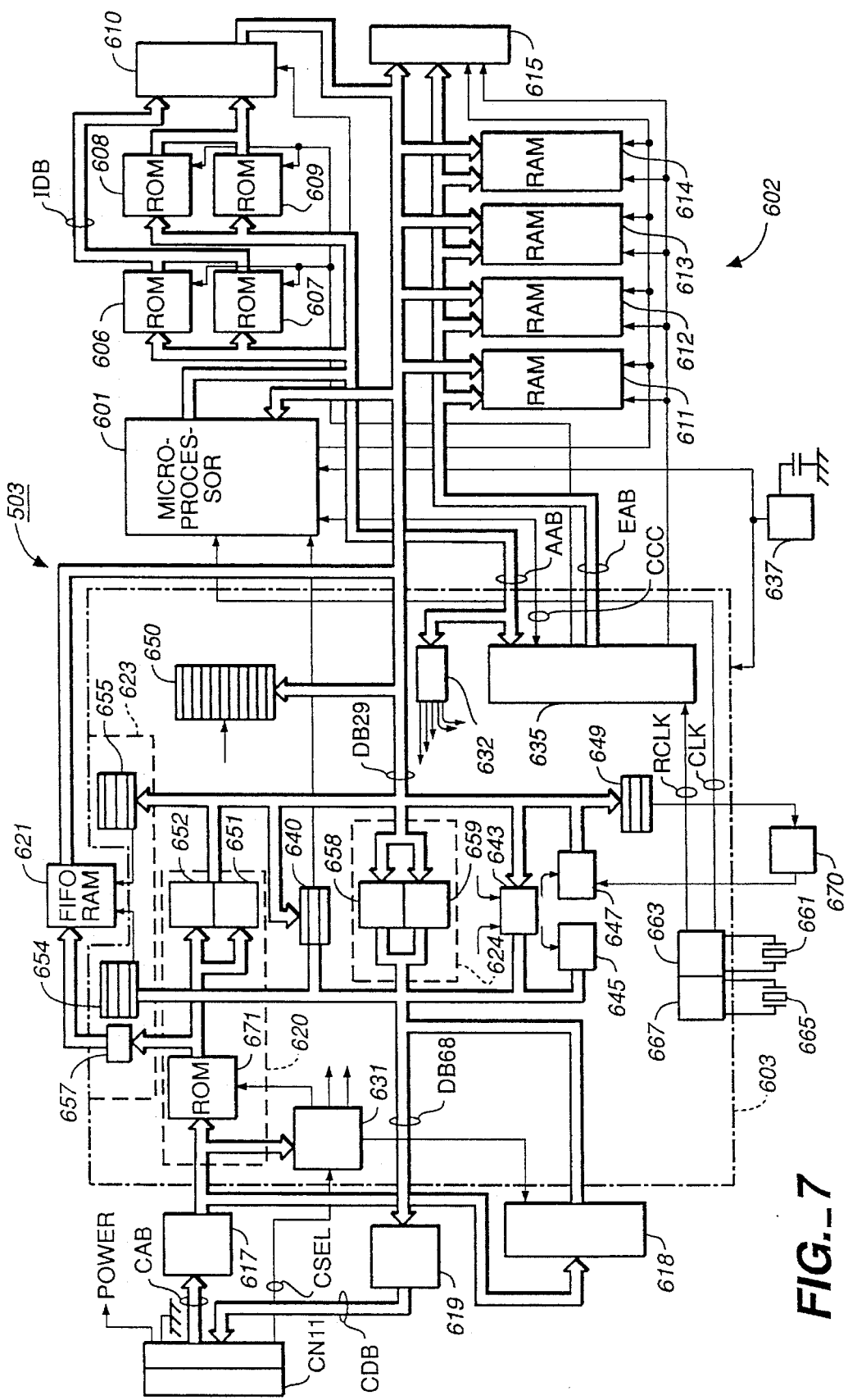
FIG._7

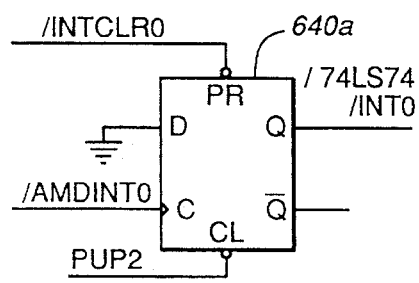
FIG._8A
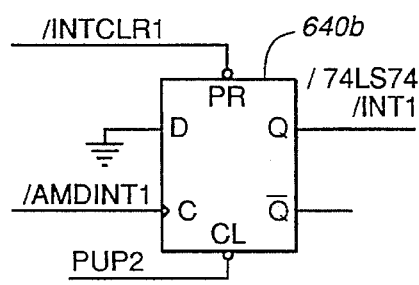
FIG._8B
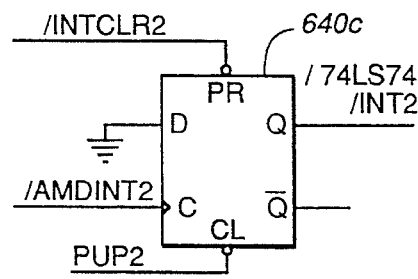
FIG._8C
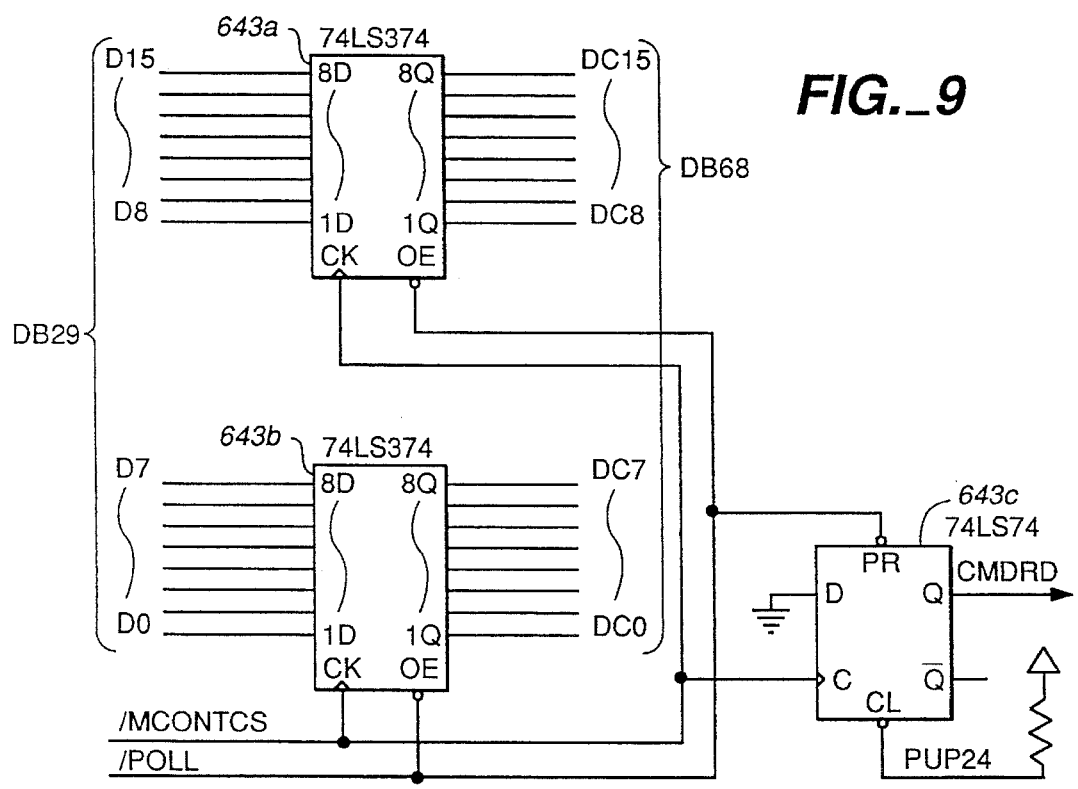
FIG._9

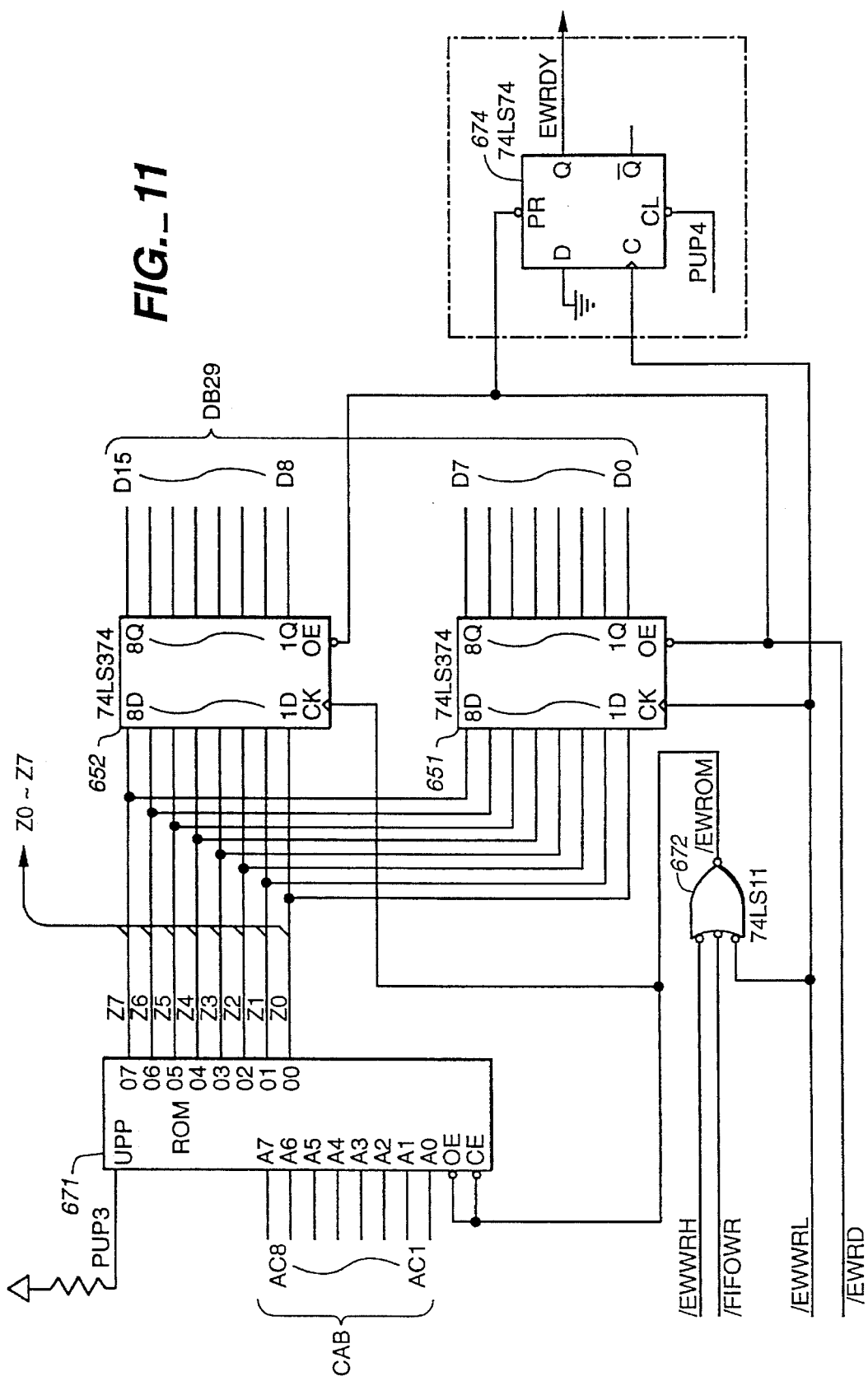
FIG._11

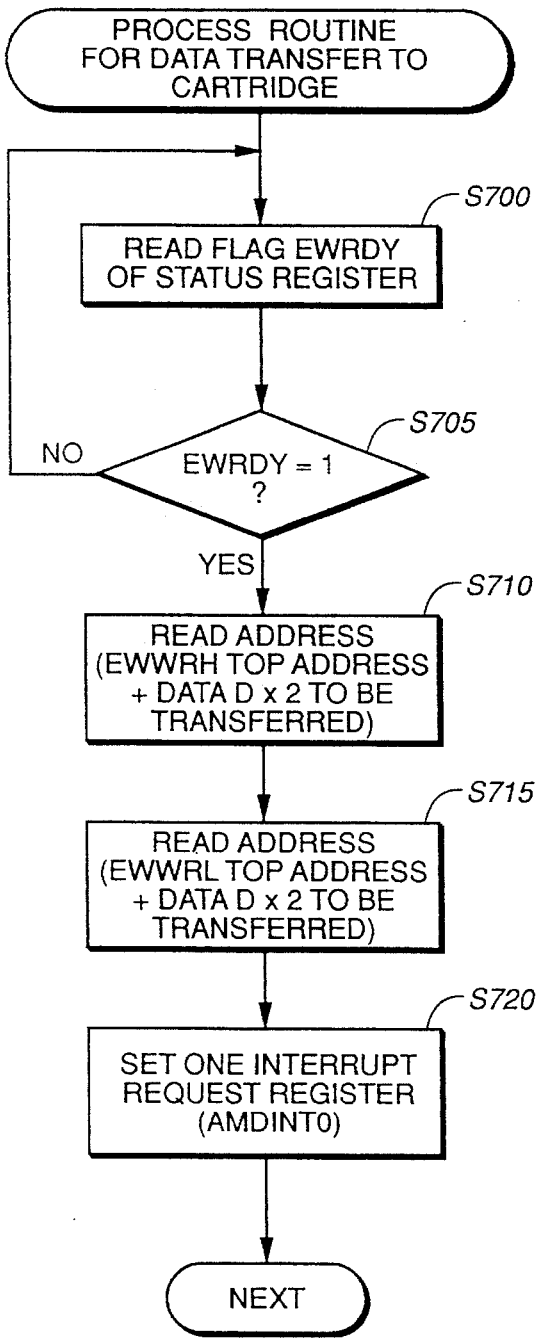
FIG._12
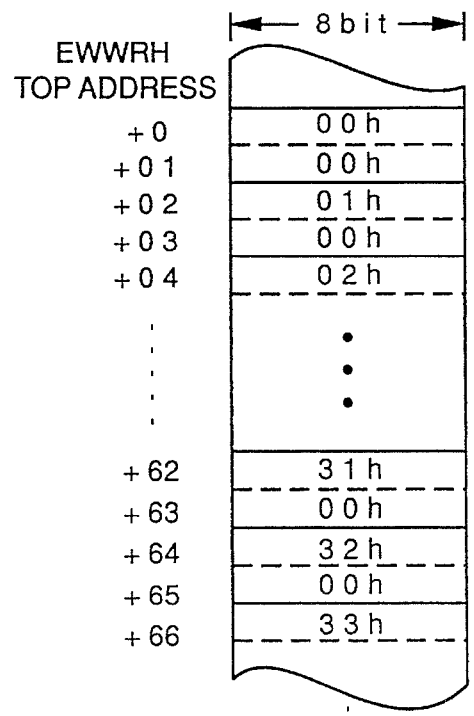
FIG._13
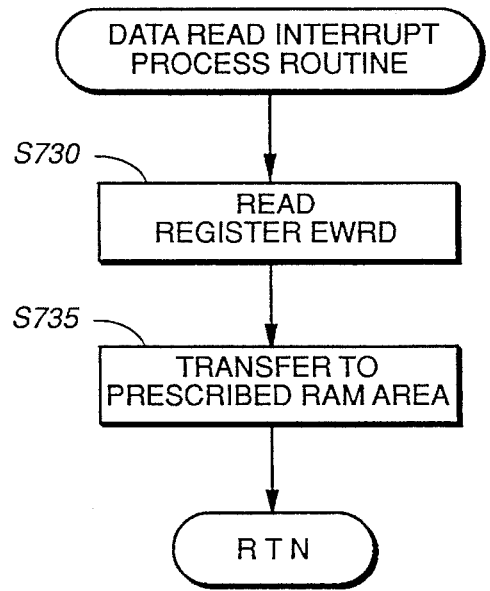
FIG._14

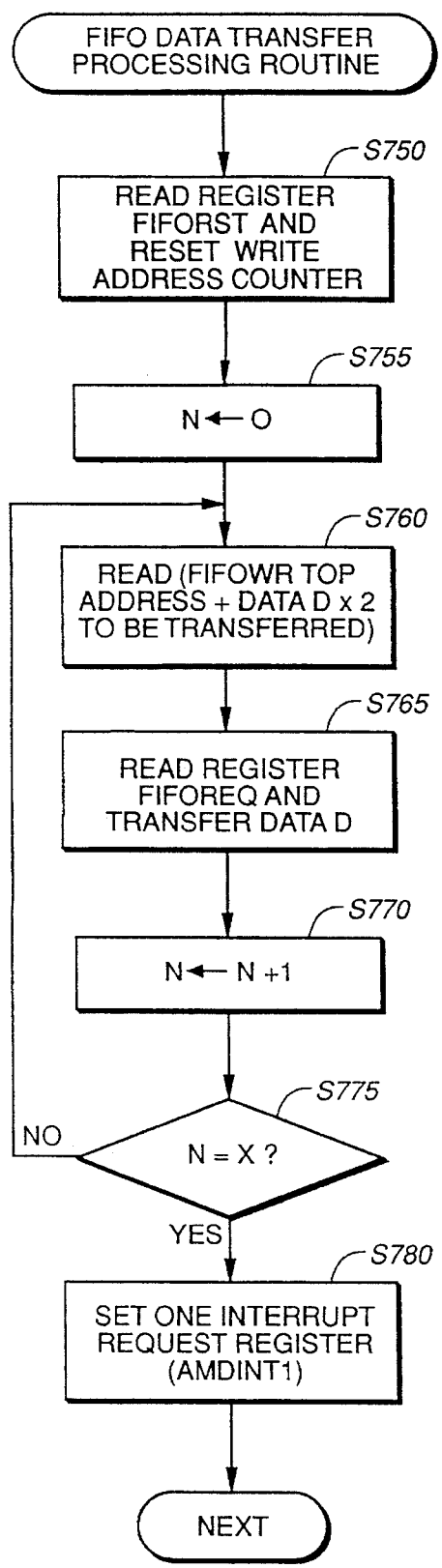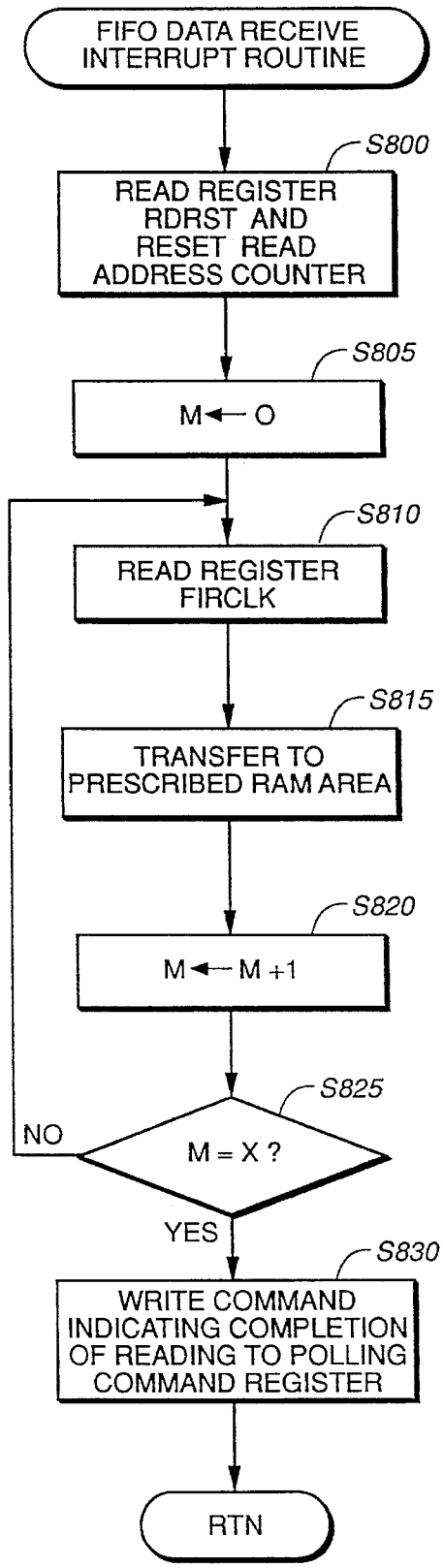
FIG._15     FIG._16

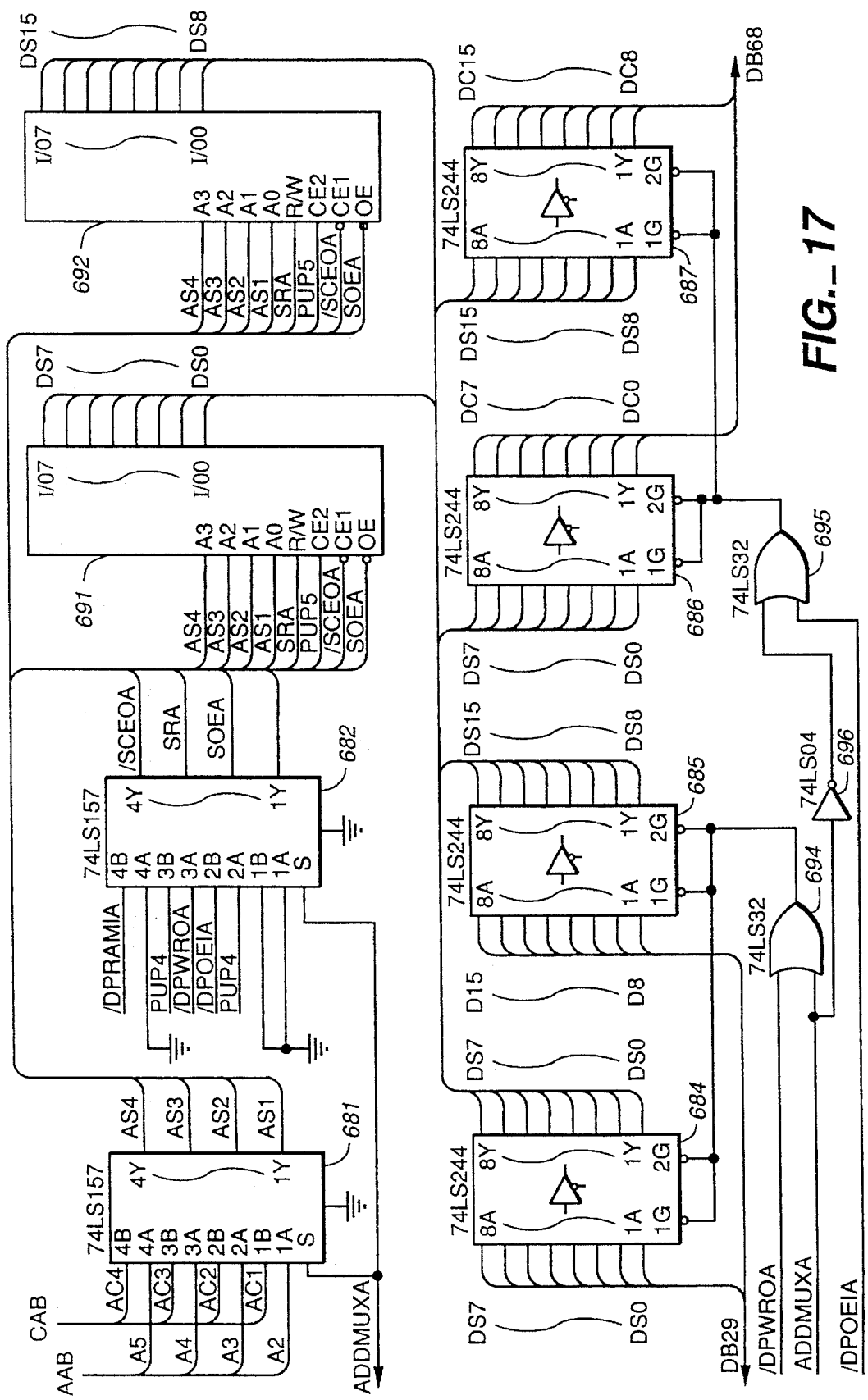
FIG._17

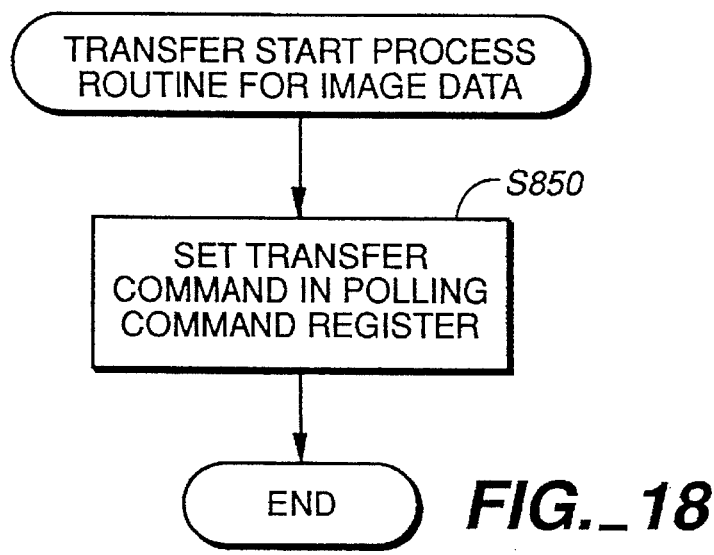
FIG._18
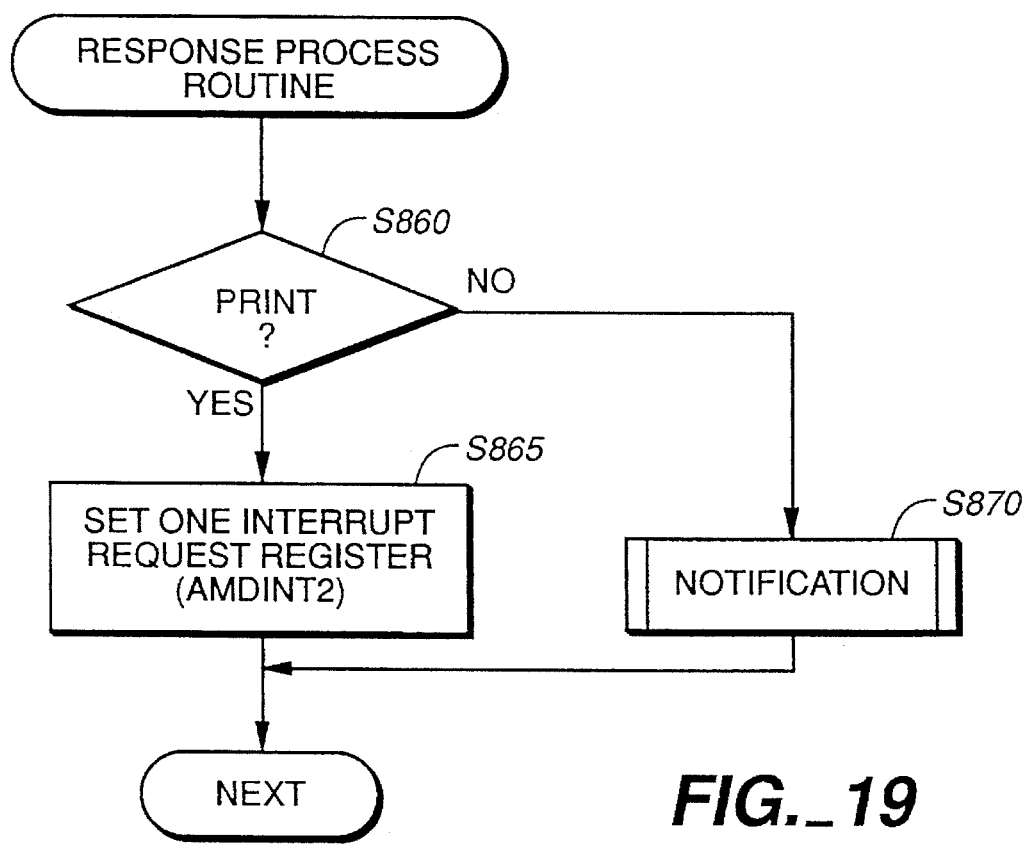
FIG._19

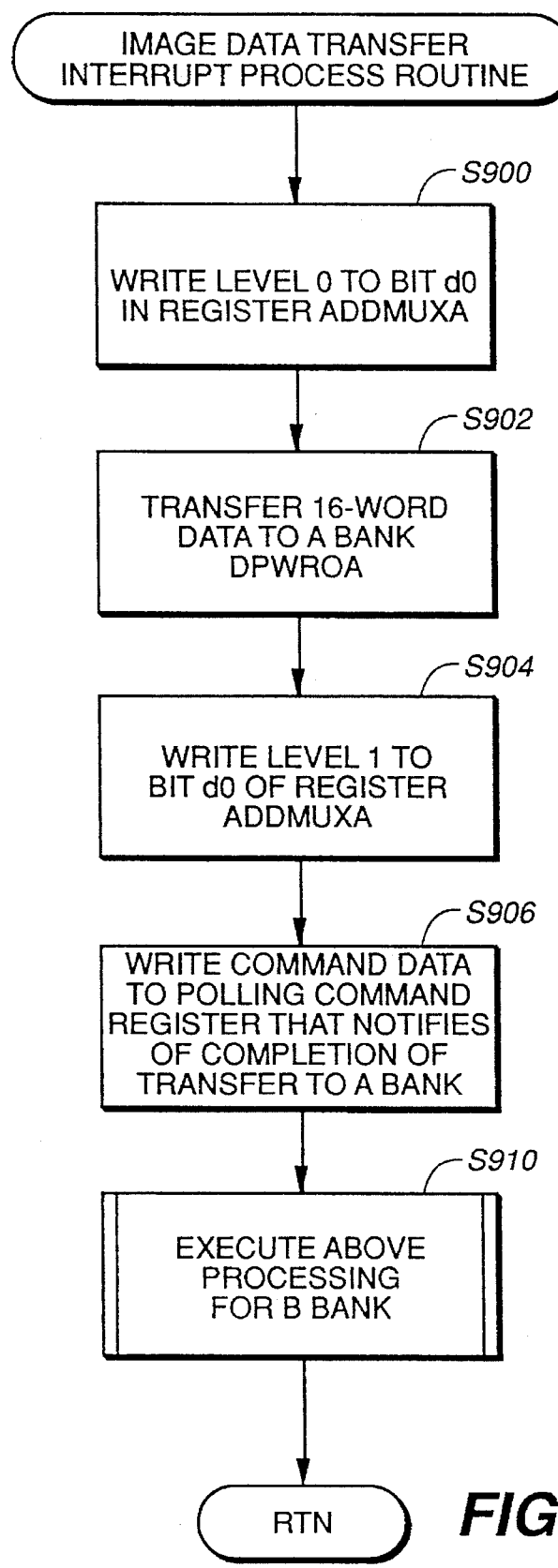
FIG._20

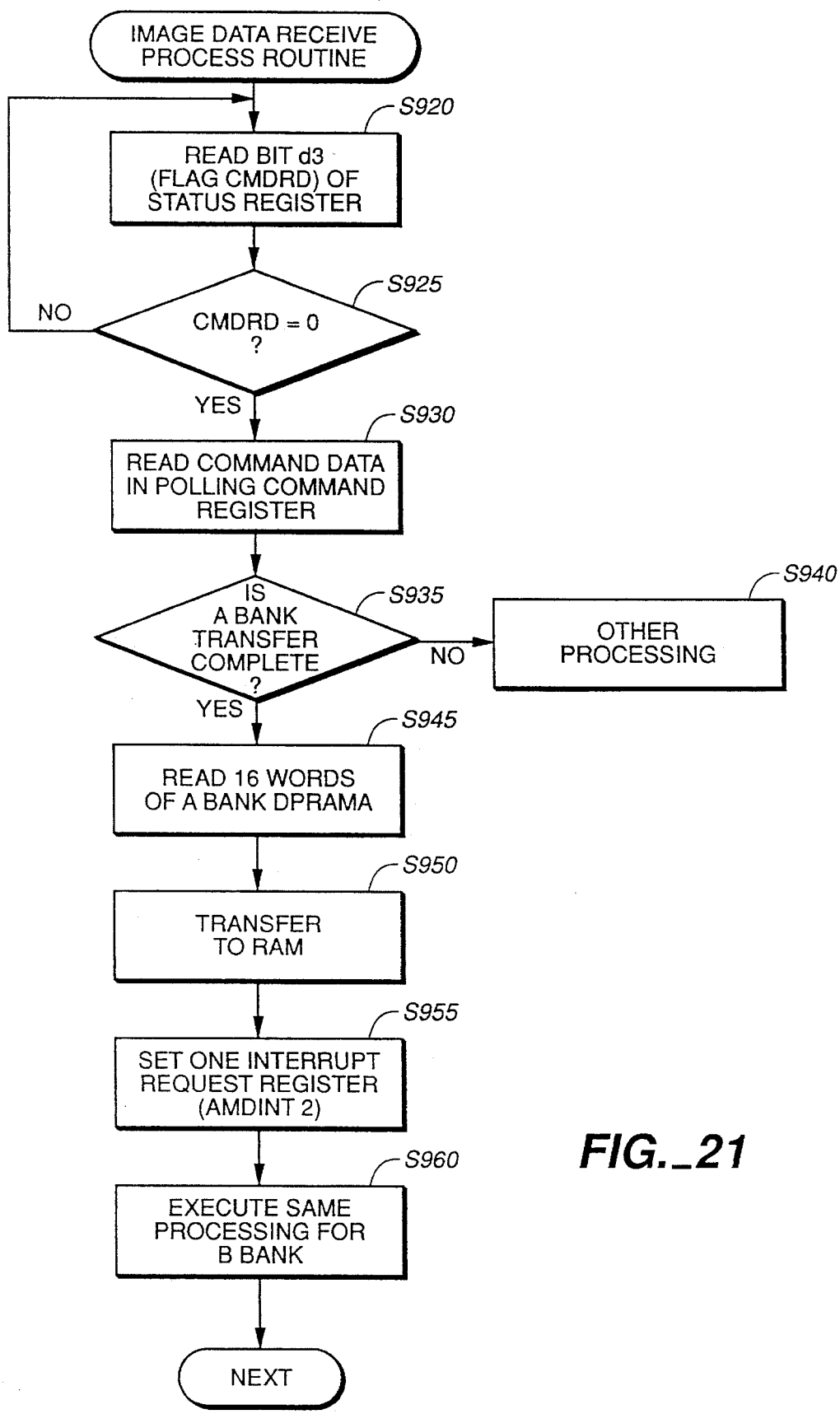
FIG._21

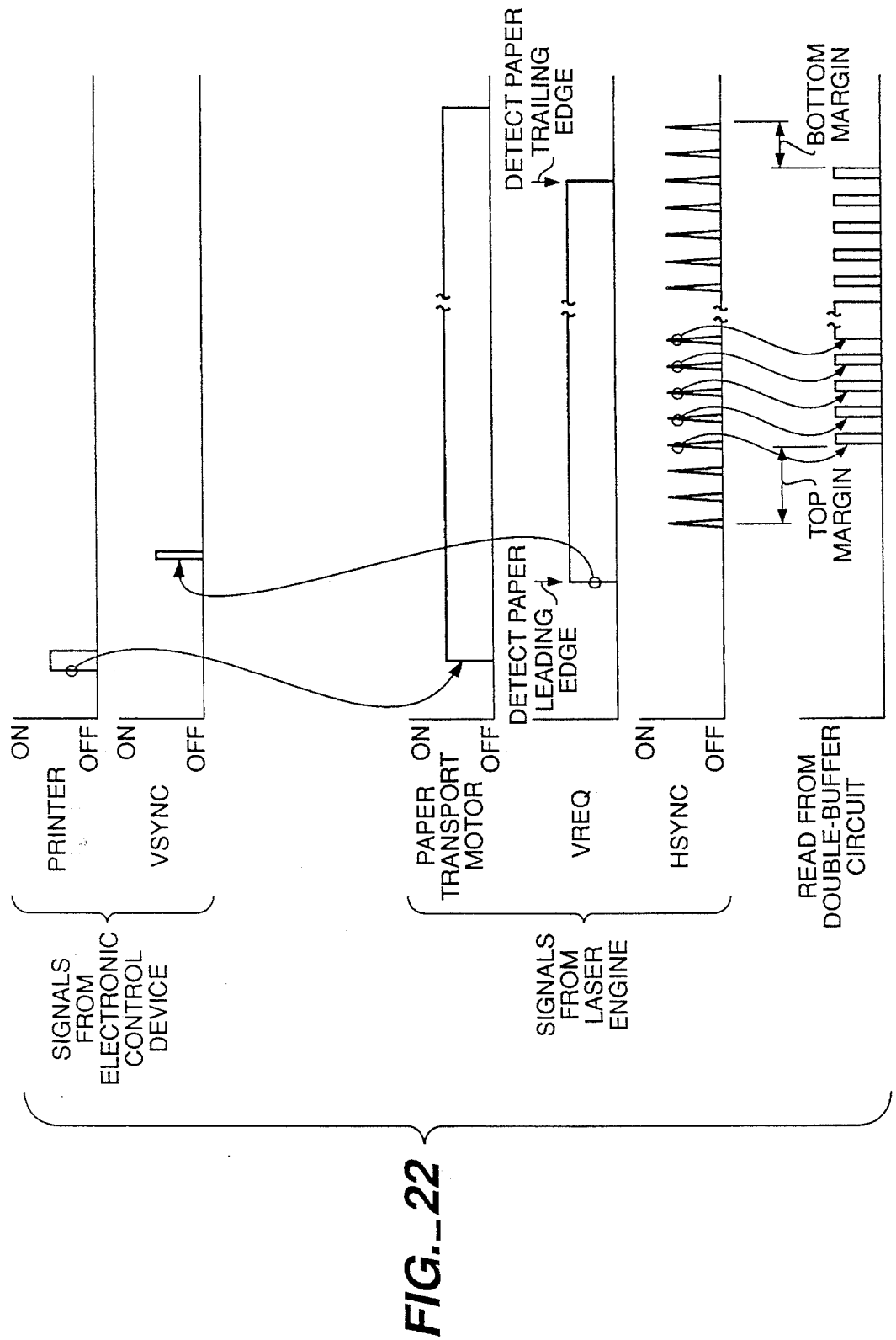
FIG._22

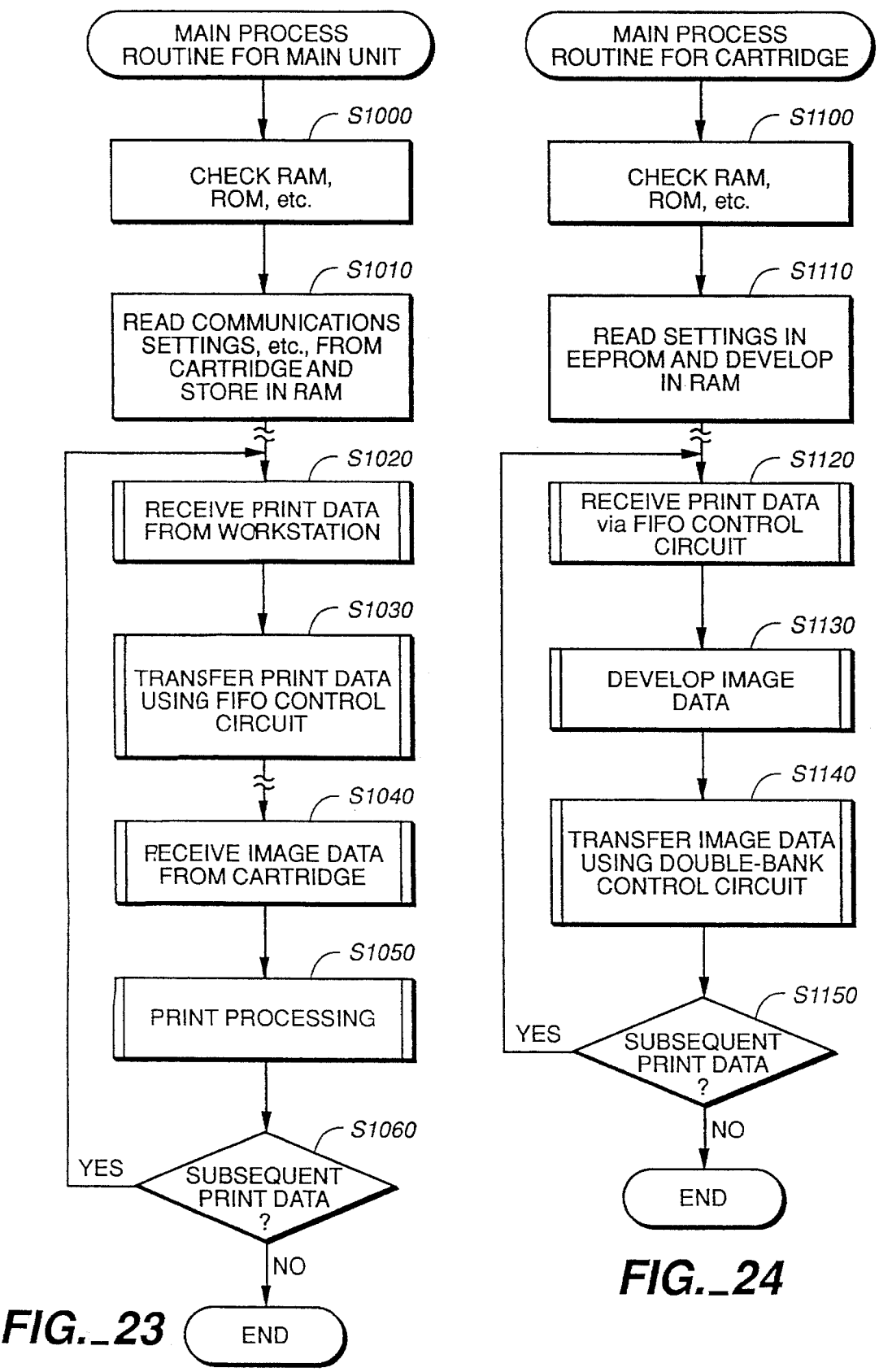
FIG._23
FIG._24

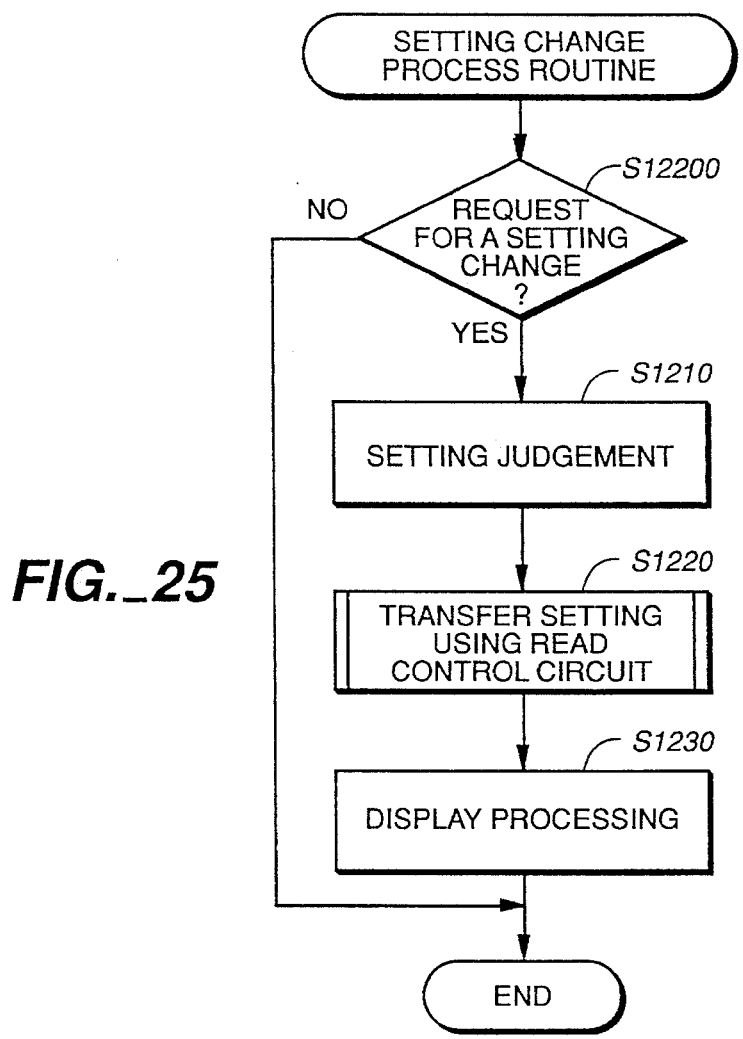
FIG._25
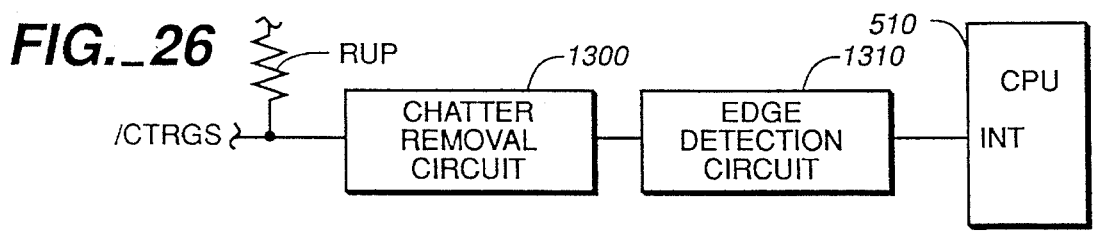
FIG._26
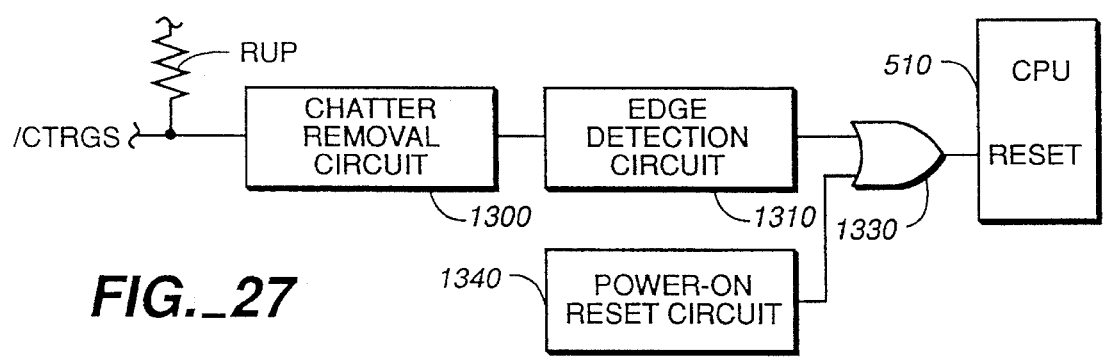
FIG._27

ACCESSORY CONTROL DEVICE AND THE INFORMATION PROCESSING DEVICE AND INFORMATION PROCESSING METHOD THAT IT USES

CROSS REFERENCES TO RELATED APPLICATIONS

This application also is related to the following other applications:

"INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING", Wakabayashi et al., Ser. No. 07/816,455, filed Dec. 30, 1991 (P16491a).

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/883,753, filed May 15, 1992 (P16655a).

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/895,537 (P16164a), filed Jun. 8, 1992.

"ADD-ON ELECTRONIC DEVICE AND ELECTRONIC SYSTEM", Wakabayashi et al., Ser. No. 07/854,643 (P16637a), filed Jul. 1, 1992.

"INFORMATION PROCESSING DEVICE AND THE ACCESSORY CONTROL DEVICE AND INFORMATION PROCESSING METHOD IT USES", Wakabayashi et al., Ser. No. 07/910,590 (P16628a), filed Jul. 8, 1992.

"APPARATUS TYPE IDENTIFICATION DEVICE AND METHOD THEREFOR", Wakabayashi et al., Ser. No. 07/908,671 (P16619a), filed Jul. 2, 1992, abandoned Jun. 1, 1993.

"TEMPERATURE CONTROL FOR ADD-ON ELECTRONIC DEVICES", Wakabayashi et al., Ser. No. 07/907,988 (P16673a), filed Jul. 1, 1992.

"INFORMATION PROCESSING DEVICE AND THE ACCESSORY CONTROL DEVICE AND INFORMATION PROCESSING METHOD IT USES", Wakabayashi et al., Ser. No. 07/911,558 (P16682a), filed Jul. 7, 1992.

The foregoing listed applications are incorporated herein by reference thereto.

BACKGROUND OF THE INVENTION

1. Field of the Invention

The present invention relates generally to accessory control devices used to change the functions or operating features of various types of existing electronic apparatus, and more particularly to an accessory device that selectively alters target apparatus operating characteristics according to whether or not it is installed. The invention further relates to information processing apparatus and methods that employ accessory control devices.

2. Related Technological Art

In recent years, digital electronic equipment, such as, personal computers, word processors, work stations, and other electronic equipment using built-in microprocessors, such as printers, facsimile machines, memo devices, musical instruments, cooking equipment, and cameras, has found extensive use throughout large segments of society. In addition, other widely used equipment such as automobiles, robots, numerically controlled machines, and a variety of other electrified products, now make use of microprocessor technology.

The application of programmable digital logic to equipment operation provides a potential of more flexible control as compared to that obtained with simple feedback controls previously used with various fixed hardware designs. In addition, using programmable logic, essential operating functions are altered by simply changing command software. One advantage of this approach is that totally different control operations are obtainable for a given piece of equipment or hardware by simply modifying the contents of program storage or memory elements, such as ROMs, that store specific processing or program steps. This new material can even be loaded as a new program from an external device such as a floppy disk. Moreover, smaller incremental changes in function, such as design revisions, can be advantageously implemented by only upgrading software.

However, the ultimate capabilities of processor controlled electronic equipment are determined by the capabilities of the processor itself. That is, each processor is itself finally limited by operating characteristics such as the maximum number of processing steps obtainable per unit time, the maximum number of data bits that can be processed at one time, the width of any data or command transfer buses, and so forth. As a result of these limitations, achieving improvements by merely upgrading software versions is at best limited to improving equipment ease of use. In reality, it has not been possible to achieve large improvements in operating features for existing electronic equipment.

At the same time, improving or upgrading software versions often requires replacing a ROM or other memory element containing the software. It is much more difficult to obtain access to or change software when replacement of such code containing ROMs is required. As a result, revising software to improve equipment operation is actually very difficult unless the particular piece of electronic equipment is already scheduled for a ROM exchange, different ROM version, at the time of its initial design, or unless the software can be supplied on a replaceable medium such as a flexible disk and used to modify stored program material.

Furthermore, once equipment operation is altered to improve or add to functionality by replacing a ROM, it is difficult if not impossible to return the functions to their original operating states. In actual use, there are few cases in which there is a desire to return functions that have simply been improved to their original state or condition, but when functions are changed or added to, there are situations in which an equipment user may want to return to an original status or condition, such as for software compatibility or speed. This problem is discussed further below using a page printer as an example.

In recent years, page printers, such as laser printers, have enjoyed widespread distribution and are rapidly becoming the leading device for high-speed data and image output from computers. Laser printers typically provide high image resolution (200 to 800 dpi) and high printing speed on the order of several pages a minute, which are desirable characteristics. Many laser printers allow the installation of an "add-on" or "accessory" cartridge in which fonts or programs are stored in a built-in ROM. When a cartridge with a stored program is installed, new functions, such as data processing functions using a Page Description Language (PDL), may be added to the laser printer capabilities. However, when such cartridges are installed, the laser printer typically can no longer utilize all of its original functions and becomes a dedicated printer for the accessory device, outputting print data using the ROM program. In this example, the printer outputs image data according to a prestored PDL program or data. More particularly, in laser printers that store various operating conditions or parameters in a rewritable nonvolatile memory (e.g., EEPROM), when a cartridge is installed the contents of that memory may be rewritten to effect or better match the interface with the new accessory device and its programming. In this latter situation, the operating parameters or conditions cannot be completely recaptured or recalled even if the cartridge is removed.

This problem cannot be overlooked as an undesirable situation in many applications for various types of electronic equipment such as printers, facsimile machines, electronic pocketbooks, musical instruments, cooking appliances, cameras and other consumer electronic products having a built-in microprocessor, or in electric equipment for use in automobiles, robots, machine tools and other industrial electronic devices, and various types of electrical equipment in which functional changes are performed by also affecting stored parameters or operating conditions.

What is needed is a new method and apparatus for interfacing an accessory control device or circuit, especially of the plug-in cartridge-type, with a variety of electronic systems or apparatus that allows substantially all of an original operating database or operating parameter set to be recalled when desired or needed. This would allow for resetting an apparatus to an original operating status or operating state when the accessory control device is disconnected.

SUMMARY OF THE INVENTION

In view of the above problems in the art, it is one purpose of the present invention to provide an accessory control device capable of altering or changing the functionality of target electronic systems or apparatus, while facilitating switching system operating parameters during insertion or removal of the accessory control device.

An advantage of the present invention is that it allows recall of an original operating parameter or condition set for the electronic apparatus when an accessory control device is decoupled from the system.

Another purpose of the present invention is to offer an information processing device in which the accessory control device is installed and an information processing method for its use.

These and other purposes, objects, and advantages of the present invention are realized in an accessory control device connected to an electronic device equipped with a first processor capable of logic operation and a rewritable first setting memory that stores at least settings referred to, or used, by the first processor. The accessory control device alters the functionality or operations of the electronic device, and comprises a procedure memory that stores procedures executed by the first processor, and a rewritable second setting memory that stores settings referred to, or used, by the first processor when installed in the electronic apparatus.

In this case, the accessory control device need not have a processor and may alter the functionality of the electronic device by having the first processor execute procedures stored in the procedure memory in the accessory control device. Even in this case, since changes in settings occurring as a result of installation of the accessory control device are stored in the second setting memory element, settings can be switched or recalled by removing or installing the accessory control device.

Of course, the accessory control device may also comprise a second processor that executes processing steps or routines independently of the first processor, a procedure memory that stores procedures executed by the second processor, and a rewritable second setting memory that stores at least settings referred to by the second processor. In this configuration, the settings referred to by the second processor are stored in the second setting memory, but the settings referred to by the first processor can also be stored in part of the second setting memory.

The first and second setting memory can be configured as a electrically backed-up semiconductor memory (RAM), an electrically erasable programmable read-only memory (EEPROM), or a storage element that stores data magnetically. Furthermore, the first and second setting memory may be either the same or differing types of memory elements.

The settings stored by the second setting memory may include conditions for communication by the electronic device with external devices. In this case, it is easy to switch the conditions for communication with external devices by installing and removing the accessory control device.

A configuration is also possible in which the electronic apparatus in which the cartridge is installed is a printer, and at least one setting related to printing parameters is stored in the second setting memory. Of course, the electronic device is not limited to printers and may be a word processor, personal computer or other electronic device with a processor.

When applied to a printer, the procedure memory of the accessory control device may store at least some of the procedures, routines, or steps used by the first or second processor to execute steps that develop print data and generate image data, and the second setting memory may store at least some of the conditions used in developing image data.

It is desirable that the second processor be a processor with a faster processing speed than the first processor and that the installation of the accessory control device improve the functionality of the electronic apparatus.

Further, it is desirable that the accessory control device be configured as a cartridge in which the printed circuit board on which the second processor is mounted is housed in a casing to facilitate its use as a single unit. Here, the second processor should be positioned for efficient radiation of heat when the accessory control device is installed in the electronic apparatus; e.g., when part of the accessory control device is exposed outside a housing for the electronic apparatus, the second processor should be disposed at a position inside the accessory control device corresponding to the exposed part of the case. In situations in which the cooling efficiency inside the electronic apparatus is fairly good, the second processor should be disposed at a position inside of a housing for the electronic apparatus.

The accessory control device can be equipped with a data receiving element that receives data from the electronic apparatus in which it is installed and a data output unit that outputs the results of any processing executed on received data by the second processor to the electronic apparatus, whereby the transfer of data between the accessory control device and the electronic apparatus can be realized. In this case, the electronic apparatus can receive data processed by the accessory control device, thus further improving its functionality.

When the accessory control device is provided with a memory that stores processing steps executed by the first processor according to the processing of the second processor, and is installed in the electronic apparatus, the first processor can be made to execute the procedures stored in this memory. In this case, since operating procedures for the first processor can be prepared in the accessory control device, the first processor and the second processor can easily be made to work together.

A configuration of only the accessory control device was explained above, but the invention is further conceived of as an information processing system comprising the accessory control device and the electronic apparatus in which the accessory control device is installed. Here, the accessory control device is equipped with procedure memory in which procedures executed by the first processor are stored, and writable second setting memory in which at least the settings referenced by the first processor are stored.

In this information processing system, the various configurations disclosed for the accessory control device are possible, as well.

Furthermore, the invention uses an operating method in which a switching condition for an operating mode of the first processor is detected, and a reference or source for settings of the first processor are switched to either the first or the second setting memory when the switching condition is detected by a switching detection element.

An operating mode switching instruction received from outside of the electronic apparatus can also be used as the switching criteria. Also, it is desirable that the operating mode of the first processor be detected by the installation or removal of the accessory control device to the electronic apparatus and that when the accessory control device is installed in the electronic apparatus, the first processor refers to the settings stored in the second setting memory instead of the first setting memory, and when the accessory control device is removed from the electronic apparatus, the first processor refers to the settings stored in the first setting memory for operation.

When the accessory control device is equipped with a second processor, the contents of the first setting memory can be stored in the memory of the accessory control device and can be rewritten with the contents of the second setting memory when the accessory control device is installed. The contents of the first setting memory can then be restored before the accessory control device is removed. Restoration of the settings can be performed by providing a switch, etc., on the accessory control device and using it to notify the second processor, or it can be performed when data to be processed by the second processor is not received for a prescribed period of time.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 illustrates a block diagram of an overall configuration of one embodiment of the present invention;

FIG. 2 illustrates an exploded perspective view of an accessory cartridge useful in the embodiment of FIG. 1;

FIG. 3 shows plane views of top and bottom surfaces of a printed circuit board used in the cartridge of FIG. 2 to support a processor and other components;

FIG. 4 illustrates signal and bus assignments for signal wires connected to connector CN11 of FIG. 1;

FIG. 5 illustrates an address map for the cartridge of FIG. 2 taken from the point of view of the electronic system;

FIG. 6 illustrates an address map of the cartridge of FIG. 2 taken from the point of view of a microprocessor in the cartridge;

FIG. 7 illustrates a block diagram of an accessory cartridge constructed according to the principles of the invention;

FIGS. 8A, 8B, and 8C illustrate exemplary register circuits useful for implementing the interrupt request registers 640 of FIG. 7;

FIG. 9 illustrates a schematic of an exemplary register circuit useful for implementing the polling command registers 643 of FIG. 7;

FIG. 10 illustrates the contents of a status register 645 of FIG. 7;

FIG. 11 illustrates an exemplary control circuit useful for implementing the read control circuit 620 of FIG. 7;

FIG. 12 illustrates a flowchart for the transfer of data by the electronic accessory control device of FIG. 7 using a read control circuit 620 as in FIG. 11;

FIG. 13 illustrates the structure of data inside of a storage ROM used in the cartridge of FIG. 7;

FIG. 14 illustrates a flowchart for data processing performed by the cartridge of FIG. 7 using a read control circuit to transfer data;

FIG. 15 illustrates a flowchart for data transfer by the electronic control device using a FIFO control circuit;

FIG. 16 illustrates a flow chart for data transfer by the accessory cartridge using a FIFO control circuit;

FIG. 17 illustrates a schematic of an exemplary double-bank control circuit for use in the accessory cartridge of FIG. 7;

FIG. 18 illustrates a flowchart chart for starting the transfer of data using the bank control circuit of FIG. 17;

FIG. 19 illustrates a flowchart of response processing executed in the electronic control device of FIG. 7;

FIG. 20 illustrates a flowchart for data transfer using the double-bank control circuit of FIG. 17;

FIG. 21 illustrates a flowchart for data transfers for the accessory cartridge of FIG. 7 using the double-bank control circuit of FIG. 17;

FIG. 22 illustrates a timing chart for image data printing occurring through control of the a laser engine by the electronic control circuit;

FIG. 23 illustrates a flowchart showing part of a main processing routine used by the electronic system;

FIG. 24 illustrates a flowchart showing part of a main processing routine used by the cartridge of FIG. 7;

FIG. 25 illustrates a flowchart showing part of the processing steps implemented to change settings stored in an EEPROM 670 of the electronic system shown in FIG. 1;

FIG. 26 illustrates a block diagram of circuitry used to generate an interrupt for a microprocessor in the accessory cartridges of FIGS. 1 and 7 when switching between settings is performed during installation and removal of the cartridge; and FIG. 27 illustrates a block diagram of exemplary circuitry useful for resetting the microprocessor in the case.

DESCRIPTION OF THE PREFERRED EMBODIMENTS

An embodiment of the invention is explained below using the attached drawings in order to describe the invention in more detail. Since the explanation of the embodiment covers a number of topics, the explanation is divided up into the following items.

- A. Overall Configuration
- B. Cartridge Structure
- C. Cartridge Address Space
- D. Internal Cartridge Configuration
- E. Data Transfer Controller 603
- F. Description of Registers
- G. Configuration and Operation of Read Control Circuit 620
- H. Configuration and Operation of FIFO Control Circuit 623
- I. Configuration and Operation of Double-Bank Control Circuit 624
- J. Printing of Image Data
- K. General Processing and Setting Changes
- L. Effectiveness of a First Embodiment
- M. Other Aspects of the invention.

Each section teaches certain aspects of the invention and its useful application to the laser printer art.

A. OVERALL CONFIGURATION

This embodiment combines a cartridge 3 as an accessory control device with a laser printer 1 as an electronic system or apparatus. Laser printer 1 uses a commonly known xerography unit, with a laser engine 5 that functions independently and uses a photosensitive drum to print images. An electronic control device 2, controls the operation of the entire laser printer 1 system, but performs printing only by sending commands to laser engine 5 through a connector CN10 and transferring image data to a prescribed buffer.

Laser printer 1 receives print instructions from a workstation or computer and performs printing using supplied print data. When accessory cartridge 3 is not installed, laser printer 1 executes printing based on built-in prescribed or predetermined control commands. Various types of control commands are built into laser printers as proposed by printer manufacturers. For example, some control commands prepare an image for printing on a page by setting the character pitch and line pitch according to so-called escape sequences provided by a workstation 7 and reading out predefined characters from a built-in font ROM that correspond to character codes received from workstation 7. In other cases, when cartridge 3 of this embodiment is installed in laser printer 1, laser printer 1 operates as a printer that develops an image using a so-called page description language (PDL). An outline of system operation in this case is given after the explanation of each section.

As shown in FIG. 1, electronic control device 2 is equipped with a commonly known microprocessor or central processing unit (CPU) 510, here chosen to be a MC68000 processor which is manufactured by Motorola. Control device 2 also employs a ROM 511 for storing programs for execution by CPU 510; an EEPROM 513 that stores 512 bytes of data in a nonvolatile condition; a RAM 512 for storing post developed print or image data; a data input/output port 514 for receiving print data from host computer or work station 7; a line buffer 515 attached to a bus line 516 for transferring data exchanged with cartridge 3; a register 517 for exchanging command and status data with laser engine 5; a console panel interface I/F 519 for providing interface control between laser printer 1 and a console panel 518; and a double buffer circuit 520 for retaining image data sent to laser engine 5.

The bus lines that connect these circuits include the usual address bus, data bus, interrupt control line, and other various bus lines, which have been simplified in the figure for purposes of clarity. Line buffer 515 includes a one-way line buffer connected to the data bus, and the data bus connected to a connector CN11 is a read-only signal line as seen from the point of view of CPU 510.

EEPROM 513 is an electrically erasable programmable ROM in which data can be written for storage and read or erased, typically in one-byte increments. Therefore, when CPU 510 rewrites data, it specifies an address, erases one byte, and writes new data in place of the erased byte. Electronic control device 2 stores, for example, the conditions for data communication with workstation 7, e.g., communication baud rate, start bit, stop bit and parity bit, an initial media source selection setting when there are multiple paper trays, and responses for errors in EEPROM 513.

Some examples of the principal types of information generally stored in the EEPROM 513 are given below. However, those skilled in the art will readily recognize that other types of information can also be stored depending on the desired application. Electronic control device 2 refers to this information when the power is turned on or when it is required for processing.

Information is typically divided into at least three categories, one being those items regarding data reception by the laser printer from an external source and interface specifications, such as whether RS232C, RS422, specific LAN, or parallel, etc. is used and specifications for serial communication such as Full/half duplex, baud rate, stop bit, parity, data length, etc. Another category is those items regarding printing such as the number of copies, paper cassette selection including upper/lower trays or manual insertion mode, and whether or not to print a start page. A third category is those items regarding error modes such as whether there is a print error description or a paper jam, and whether or not to store image data when a paper jam occurs.

An exemplary double-buffer circuit 520 is shown in FIG. 17 and uses two RAMs, RAMs 520A and 520B, which typically accommodate up to 8 lines of print data for laser engine 5, i.e., which corresponds to a 4 kilobytes of memory capacity. A memory write controller 520C is used to alternately write image data to one of these RAMs from CPU 510. A memory read controller 520D alternately reads data from each of the two RAMs, 520A and 520B, and transfers that data to laser engine 505 where it is converted into video signals synchronized with the timing of the rotation of the photosensitive drum in order to print data. Two RAMs 520A and 520B are provided, and reading and writing of data takes place alternately, because CPU 510 and laser engine 5 are configured to access memory, these RAMs, independently.

After CPU 510 has written data to one RAM, it sets a flag at a specific bit position of register 517 to show the presence of new data. In response, laser engine 5 checks this flag and reads the image data stored in the RAM from the appropriate addresses to which it was written. During the reading process, another bit in register 517 is set to inform CPU 510 which RAM is being read to prevent access. Since only one RAM is being accessed by laser engine 5 at this time, CPU 510 writes the next eight lines of image data to the other RAM during this period. After the process of reading data from one RAM is complete, laser engine 5 resets the appropriate flag bit and proceeds to read data from the other RAM. The speed at which CPU 510 writes data is faster than the speed at which laser engine 5 reads data, that is, the print execution speed. Therefore, a memory access conflict between the two is generally automatically avoided and the transfer of one page of image data takes place reliably.

As stated, cartridge 3 is mounted in connector CN11 of electronic control device 2. When power is turned on or applied to printer 1, electronic control unit 2 determines whether or not cartridge 3 is connected to connector CN11. If a cartridge is detected, an internal reset for electronic control unit 2 is activated. After being reset, control unit 2 executes a jump to a pre-specified address of a ROM provided in cartridge 3 (discussed later). Subsequent to this jump, control unit 2 sequentially executes process steps provided by cartridge 3. In the mean time, cartridge 3 interprets the PDL data output to laser printer 1 from work station 7, develops it into image data, and provides program steps to control unit 2 so that the appropriate printing occurs using laser engine 5.

B. CARTRIDGE STRUCTURE

Cartridge 3 is designed as a cartridge to be inserted in a cartridge insertion opening or port in electronic apparatus such as a laser printer. Cartridge 3 has a structure like that shown in the exploded perspective view of FIG. 2 in which a multilayer printed circuit board 550 (printed circuit board below) is mounted between an upper case 100, recessed on the inside, and a plate-like lower case 120. A cap 140 is fitted on the end of the casing adjacent the connector side of printed circuit board 550. A microprocessor 601 and other circuit elements which form the accessory control device circuitry are mounted on printed circuit board 550. Both upper case 100 and lower case 120 are preferably made from aluminum, while other materials with a sufficiently high thermal transfer rate can also be used as desired. The high heat conductivity of aluminum allows heat generated by internal components to be effectively transferred outside of the casing and disposed of.

The two grounding springs 122 are shown attached to lower casing 120, as shown in FIG. 2, to provide electrical contact with conductive surfaces within the printer adjacent to the cartridge and allow cartridge 3 to be adequately grounded. The springs 122 are typically secured in place by fasteners such as rivets 124. In addition, in order to exert an upward bias to, or bending force on, printed circuit board 550, a resilient or compressible bias element 126 is placed on a bias retainer 128 on an inner surface of the lower casing. Bias element or piece 126 is typically formed from a cylindrical shaped compressible, elastic, or resilient material such as silicon rubber and presses against printed circuit board 550 in an area directly beneath microprocessor 601 to push this area, and, thus, microprocessor 601 upward. However, those skilled in the art will recognize that other compressible or elastic materials may be used for this bias (pressure) function.

A sheet of heat dissipating material 102, such as a piece of silicon rubber, is disposed between an upper surface of microprocessor 601 and an inner surface of upper casing 100 to improve the closeness of fit or thermal contact between these elements and, therefore, the corresponding thermal conductance. As compressible bias element 126 pushes upward on printed circuit board 550, microprocessor 601 is also pushed upward, increasing the surface contact pressure between microprocessor 601 and heat dissipating material 102, and between heat dissipating material 102 and upper casing 100. As a result, heat dissipation from microprocessor 601 along an upward path, extending to casing 100, occurs more efficiently.

During assembly, upper casing 100 is first turned over and heat dissipating material 102 mounted in a designated location on upper casing 100. Material 102 can be secured in place using a retaining element, such as a grove, or a thermally conductive adhesive. Printed circuit board 550 is then mounted inside of upper casing 100, generally using a single screw 160, possibly in combination with one or more grooves, raised edges, or lips in the casing walls. Lower casing 120 is then mated to upper casing 100 and fixed in place using four screws 162, one secured to a threaded portion in each corner of casing 100. Assembly of cartridge 3 is completed by inserting cap 140 into a cap opening formed between upper casing 100 and lower casing 120.

Upper and lower surfaces of printed circuit board 550 are shown in FIGS. 3A and 3B, respectively. As shown in FIG. 3A, an insertion plug 551 is formed on one end of a top, or bottom, surface of printed circuit board 550. This plug or plug section of the board consists of a series of electrodes or contacts arranged in parallel on surfaces of the board for contacting matching electrical contacts inside the printer cartridge slot. The number of contacts is determined by the corresponding size of a matching connector conventionally provided in the printer. Plug section 551 may also employ orientation slots or guides, if also used in the printer.

In this embodiment, microprocessor 601 is shown installed on the non-insertion plug 551 end of printed circuit board 550. Microprocessor 601 is typically secured in this location by soldering processor connection pins 601P to contact pads on printed circuit board 550 after insertion through contact/mounting holes or vias. However, it is contemplated that other mounting techniques may be employed such as surface mounting technology or, where space permits, a socket assembly could be provided.

Two pairs of ROMs 606, 607, and 608, 609, are shown positioned near microprocessor 601 along each edge or side of printed circuit board 550. These ROMs are used to store one or more control programs, etc., for execution by microprocessor 601. Four tri-state buffers 617 are also shown mounted adjacent to microprocessor 601 in a square configuration in the center of printed circuit board 550. Four dynamic RAMs 611 through 614 are shown positioned between tri-state buffers 617 and plug section 551, and are typically mounted parallel to each other. For clarity in illustration, any wiring or interconnect patterns present on the top and bottom surfaces of printed circuit board 550 have been omitted. For all of the circuit elements or components described above, the specific configurations, whether parallel, grouped, or irregular, are for purposes of illustration, and are not intended as a limitation inasmuch as other configurations are also contemplated within the teachings of the invention.

Due to its complexity and the interconnection density, microprocessor 601 is typically manufactured or packaged as a pin grid array (PGA) type of device. However, those skilled in the art will readily understand that other package types such as the SOJ, SOP, and QFP (Quad Flat Pack) styles can be employed as desired within the teachings of the invention. An exemplary microprocessor 601 is the Am29030, with a typical operating clock speed of 25 MHz, which is a RISC type microprocessor manufactured by Advanced Micro Devices Corporation (referred to as AMD).

As shown in FIG. 3 (B), plug 551 is also shown having contacts formed at one end on the bottom surface of printed circuit board 550, in addition to those on top, as appropriate. An ASIC type device or component (application-specific large scale integrated circuit device) 603, which contains elements such as control circuits and registers for microprocessor 601, is mounted in the center of the bottom surface more toward plug 551. Two pairs of tri-state buffers 619 are shown mounted on either side of microprocessor 601. Contact or mounting pins 601p for microprocessor 601, or any associated mounting socket, typically protrude through printed circuit board 550, and are shown residing in a surface on the end opposite from plug 551.

An EEPROM type device is generally used to store configuration data for the printer, that is, parameters related to print operation, such as number of printed pages, paper size, margins, fonts, and communications parameters. Therefore, an EEPROM 670 is shown positioned along one edge or side of printed circuit board 550, close to ASIC 603. A ROM 618 is positioned adjacent to EEPROM 670 and used to store a program for controlling or operating a microprocessor used in the printer.

Two oscillators 661 and 665 are shown in FIG. 3B as being installed on an opposite edge or side of printed circuit board 550 from EEPROM 670. The first of these oscillators, 661, generates a signal used to form the basic clock for operating microprocessor 601 and associated support circuit elements. For example, oscillator 661 is typically capable of generating a clock signal at a frequency up to 50 MHz which is used to operate the microprocessor. However, those skilled in the art will recognize that each microprocessor chosen for implementing microprocessor 601 has its own optimum operating frequency and the frequency of oscillator 661 is chosen or adjusted accordingly for each design. For example, in this embodiment, the AMD processor is preferably operated at only 25 MHz. The second oscillator, 665, generates a clock signal used in an interval timer processor, which is described below. For example, oscillator 665 typically generates a 5 MHz clock signal. If microprocessor 601 is provided with a clock signal from a dedicated (independent) oscillator in this manner, the frequency of operation for microprocessor 601 can be easily changed by simply replacing dedicated oscillator 661 with one operating at another desired frequency.

Additional elements, such as a reset device 637, FIFO memory 621, and NAND gate 680 are positioned adjacent to oscillator 665, and aligned along the edge of printed circuit board 550. Five tri-state buffers 684 to 688 are also mounted parallel to plug section 551.

As shown in FIG. 3, all of the generally rectangular circuit elements or components are aligned substantially parallel to the length-wise direction of printed circuit board 550 on both top and bottom surfaces. As indicated by directional arrows in the figure, this type of layout allows air to more easily flow from plug 551 toward the direction of, or across, microprocessor 601, contributing to more efficient cooling of microprocessor 601.

As stated above, cartridge 3, is configured to be inserted into a cartridge slot otherwise used for providing printer font information. Common font cartridges merely hold a ROM, or ROMs, in which font data is stored and then used to recreate the font "style" for given text. In contrast, accessory cartridge 3 of this embodiment, contains control circuitry in the form of microprocessor 601, ROMs 606 through 609, ROM 618, and ASIC 603 which provide programmed processing functions for print data.

The wiring relationship of plug 551, formed on one end of printed circuit board 550, and connector CN11 is shown in FIG. 4. As shown in FIG. 4, plug 551 employs 25 pins on either side of two sided (sides A and B) printed circuit board.550. In FIG. 4, a signal name is used to label each corresponding pin of plug 551. A slash mark [/] before a signal name indicates that the signal is active low [logical 0].

In FIG. 4, an /ASB signal represents an address strobe signal (ASB) transmitted by CPU 510 in the printer (here a Motorola MC68000), /UDS represents an upper data strobe signal output by CPU 510, and /LDS is a lower data strobe signal output by CPU 510. An /ADS signal is an address strobe (ADS) assist signal generated based on certain parameters and status of the address strobe signal /ASB in electronic control device 2. The /ADS address strobe assist signal provides an activity indication when the printer starts up or is initialized, which is different for different printers. As discussed later, in this embodiment, the printer type is determined according to the activity that takes place when the /ADS address strobe assist signal is initialized.

An /ODTACK signal is shown which is an output data acknowledge signal transferred from cartridge 3 to electronic control device 2. An /CTRGSEL signal represents a signal used by CPU 510 to select cartridge 3 and access ROM, registers, etc., that are allocated to internal address spaces. Signals A1 through A20 are addresses or address signals, and signal R/W is the read and write signal, both output by CPU 510, while signals D0 through D15 are signals provided by cartridge 3. Signal SCLK is a clock signal output by an oscillator (not illustrated) built into laser printer 1.

Signal /CTRGS is a cartridge-registration or detection signal provided in laser printer 1 which is pulled down or low when cartridge 3 is inserted. As a result, CPU 510 detects the presence of cartridge 3 in connector CN11.

CPU 510 typically uses 23-bit address signals for signals A1 through A23 to specify an address word and the /UDS and /LDS signals to specify high (upper) and low (lower) end bytes, respectively, of each word. As a result, CPU 510 is able to handle 16 megabytes of address space, generally residing at addresses from 000000h to FFFFFFh. Here the symbol 'h' that is attached to the end of the address indicates a hexadecimal number or unit.

C. CARTRIDGE ADDRESS SPACE

Cartridge 3 is allocated some of the address space, specific address range, accommodated by electronic control device 2. CPU 510 uses addresses within a range or space bounded by the values 000000h and FFFFFFh, but part of this address range is already allocated for use by a ROM cartridge. The space allocated to cartridge 3 changes depending on the specific model or type of the laser printer. In the case of Hewlett-Packard laser printers, as indicated in the left hand column of FIG. 5, memory capacity or space allocation is normally up to 2 megabytes, providing for address values ranging from say 200000h to 3FFFFFh or from 400000h to 5FFFFFh.

However, as previously discussed, the typical microprocessor 601 used in cartridge 3 is an AMD model AMD29030—25 MHz which can handle 4 gigabytes of memory at address values ranging from 00000000h to FFFFFFFFh. In addition to ROM and RAM allocations within this address space, allocation occurs for various registers used for data exchange with the printer electronic control device 2. This type of allocation is illustrated in FIG. 6. The configuration of components inside of cartridge 3 is described below along with address space requirements for both microprocessors used within the combined cartridge and printer system.

D. INTERNAL CARTRIDGE CONFIGURATION

The internal configuration of the cartridge 3 is shown in FIG. 7. As shown in FIG. 7, cartridge 3 is configured around microprocessor 601, which handles all control, for cartridge operations. The cartridge is also shown using a memory area 602 comprising ROM, RAM, and peripheral support circuitry, a data transfer controller 603 to control data exchange with electronic control device 2, and some additional circuitry.

Memory area 602 employs a series of ROMs 606 through 609, which generally aggregate to a total memory capacity of 2 megabytes, and are used to store programs for microprocessor 601 execution. A selector 610 is used to provide bank switching of ROMs 606 through 609. RAMs 611 through 614, also provide a total memory capacity of at least 2 megabytes, and are used to retain print data received from electronic control device 2 and to also retain post developed image data. ROMs 606 through 609 are generally configured as mask ROMs, each having 16 bits by 256 kilobits of capacity, totaling 4 megabits of memory. As shown in FIG. 6, ROMs 606 to 609 are allocated to address spaces 00000000h to 1FFFFFh. Each ROM set 606, 607, and 608, 609 form a 2-unit bank creating a 32-bit data bus. ROMs 606 and 609 and microprocessor 601 are connected by address bus AAB and a control signal bus. Data bus IDB of each of ROMs 606 to 609 is also connected to data bus DB20 through data selector 610. Therefore, microprocessor 601 is able to read data from ROMs 606 through 609.

All address signals, except the three low end bits (A0, A1, and A2) from microprocessor 601 on address bus AAB, are input to ROMs 606 and 607, and ROMs 608 and 609. Because the two low end bits (A0 and A1) are not input, data is read by microprocessor 601 in units of one word, or thirty-two bits (4 byte units). In addition, if the third lowest address bit A2 is not used when reading data, ROMs 606 to 609 output data simultaneously, and data selector 610 makes adjustments to data being output simultaneously. That is, the access of the ROMs by microprocessor 601 often takes place from consecutive addresses. Therefore, using 32-bit data words, consecutive words are read from ROMs 606 through 609. If consecutive words are actually read, the two-set ROM banks are switched in sequence by data selector 610 and the data is read consecutively. As a result, reading two consecutive words of data is extremely fast.

RAMs 611 through 614 are each generally implemented as 16 by 256 kilobit DRAMs, for a capacity of 4 megabits. As shown in FIG. 6, these RAMs are allocated to 2 megabytes of address space or addresses from 20000000h to 201FFFFFh. An additional 2 megabytes of memory can be added to cartridge 3 using expansion RAM interface 615 which is allocated to addresses from 20200000h to 203FFFFFh. Typically, a maximum of 2 megabytes of SIMM type RAM can be installed in expansion RAM interface 615. RAMs 611 through 614 and expansion RAM 615 data lines are connected directly to a data bus DB29, which is the microprocessor 601 data bus. The RAM address lines are connected to microprocessor 601 address bus AAB through a data transfer controller 603. Register I/O, discussed later, is allocated to address spaces from 80000000h.

Returning to FIG. 5, when viewed from the perspective of control device 2, cartridge 3 ROM is allocated to the first 128 kilobytes. That is, cartridge 3 also stores programs that are to be executed by CPU 510. When cartridge 3 is inserted, CPU 510 executes a jump command to the address specified for this ROM after initialization is completed, and CPU 510 subsequently operates according to processing steps stored in this ROM.

When CPU 510 accesses the first 128 kilobytes of the 2 megabyte space allocated to cartridge 3, ROM 618 is accessed by an address signal output through address buffers 617 provided for connector side address bus CAB of cartridge 3. The commands and data stored in ROM 618 are sent to CPU 510 through data buffer 619 formed on data bus CDB of the connector. The 'X' used in labeling the FIFO (lower right) addresses in FIG. 5 represents the four high end bits of the first address of the allocated address spaces.

E. DATA TRANSFER CONTROLLER 603

A variety of control and status registers are accessed at addresses other than those addresses allocated to ROMs and RAMs in the address maps shown in FIG. 5 and FIG. 6, and are provided for data transfer controller 603, which is described next. The description chiefly relates to circuitry with reference to address maps (FIGS. 5 and 6) as appropriate.

Data transfer controller 603, shown in FIG. 7, is formed using an ASIC having around 7,900 usable gates. This ASIC is a standard cell, model No. SSC3630, produced by Seiko Epson Corporation, and it is a low-power element manufactured using a CMOS process. Data transfer controller 603 was designed using Seiko Epson's ASIC design system, LADSNET, which is a CAD system. This CAD system contains latches, flip-flops, counters, programmable logic arrays and other elements used in logic circuit design in the form of libraries, and after the required logic circuit is designed using these, the pattern of the ASIC can be automatically generated.

Data transfer controller 603, controls the exchange of data between electronic control device 2 and microprocessor 601 of cartridge 3. This data exchange uses a read control circuit 620 to send data through a read only data bus from electronic control device 3 to cartridge 3; a FIFO control circuit 623 to pass data through a FIFO memory 621, using read control circuit 620; and a double bank control circuit 624, which makes data from cartridge 3 readable by electronic control device 2. FIFO memory 621 is configured as a RAM type memory device that sequentially stores and reads data using a first-in-first-out procedure. An exemplary component useful for implementing this RAM is a RAM circuit, part number M66252FP, manufactured by Mitsubishi Electric.

In addition, in data transfer controller 603, address bus CAB is connected through address buffer 617 and data bus CDB is connected through data buffer 619. A first decoder 631, formed in controller 603, receives address bus CAB and cartridge selector CSEL signals and outputs selection signals to other elements in data transfer controller 603. In the same manner, address bus AAB and control signal CCC, from microprocessor 601, are connected to transfer controller 603 using a bus controller 635 formed in controller 603. A second decoder 632 is connected to address bus AAB and outputs selection signals to other data transfer controller 603 circuitry. Furthermore, bus controller 635 outputs address signals and control signals to ROMs 606 through 609 and RAMs 611 through 614, as well as expansion RAM interface 615.

In addition to the above elements, a variety of other registers are provided within data transfer controller 603. Beside normal read and write operations, many other registers are automatically written to when special processing takes place. The configuration of these special registers is described below.

Taken from electronic control device 2 point of view, cartridge 3 is a read only device, and registers writable from electronic control device 2 are configured to be written to using a read operation from a specified address. That is, by specifying a particular address, a selection signal is output from first decoder 631 and data is written to a certain register as a result. Reading from the registers takes place using normal read cycle operations. Data reading and writing by microprocessor 601 also occurs using normal read and write operations.

In FIG. 7, registers are shown being connected to a readable bus and writing operations are indicated by only arrows. Such registers are, interrupt request registers 640, polling command register 643, status registers (register STATUS in FIG. 5) 645, transfer flag register (register BPOLL in FIG. 6) 647, PROM control register 649 and control register 650.

Among these registers, registers other than status register 645 and transfer flag register 647 represent a generic name for multiple registers allocated as memory I/O maps for CPU 510 or microprocessor 601 and are not necessarily allocated to consecutive addresses. Registers AMDINT 0, 1, and 2, and registers AMD CLR 0, 1, and 2, shown in FIGS. 5 and 6, belong to interrupt register 640. Registers POLL and MCONTCS belong to polling command register 643. PROM control registers 649 include the registers EEPCS, EEPSK and EEPDI.

All registers not belonging to read control circuit 620, FIFO control circuit 623 or double bank control register 624, and not mentioned in the above description, generally belong to or form part of control register 650. These are registers ADDMUXA, ADDMUXB, CLKDIV, RTCVAL, RTCON, RTCSEL, RTCCLR and SYSKEEP, which are shown in FIGS. 5 and 6.

Among the various portions of FIGS. 5 and 6, EWWRL and EWWRH, which are each 512 bytes in size, are areas used for writing to a first latch 651 and a second latch 652 of read control circuit 620 from electronic control device 2. Register EWRD is equivalent to seeing latches 651 and 652 as a one word latch from microprocessor 601 point of view. Registers FIFOREQ, FIFORST, and FOFOW are equivalent to FIFO register 653 of FIFO control circuit 623. Registers FIRCLK, RDCLK, FIFORD, and RDRST are equivalent to FIFO read register 655 of FIFO control circuit 623. A latch 657 is also provided in FIFO control circuit 623 to maintain data to be written to FIFO memory 621 using some of the functions of read control circuit 620.

Portions of FIG. 5 labeled by the symbols DPRAMA and DPRAMB represent buffers having a 32 byte capacity. These buffers are equivalent to viewing first and second buffers 658 and 659 of double bank control circuit 624 from electronic control circuit 2 side. These banks, DPWROA and DPWROB, shown in FIG. 21, are what is seen by microprocessor 601 when viewing buffers 658 and 659. Certain bits d1 and d2 of status register 645 are also used for the exchange of data through double bank control circuit 624. Details of this exchange are provided below.

F. DESCRIPTION OF REGISTERS

Interrupt request register 604 is a register that generates, or transfers and retains an interrupt request from electronic control device 2 to microprocessor 601. Three levels, and three corresponding registers (AMDINT 0, 1 and 2), are provided for interrupts from electronic control device 2 to microprocessor 601, as shown in FIG. 5. An interrupt request to microprocessor 601 is generated by electronic control device 2 reading any of the registers of interrupt request register 640. This register is set by the read operation of electronic control circuit 2. However, data read in this operation has no meaning and is irrelevant to the generation of interrupt requests.

Specific examples of configurations of these interrupt request registers 640 are shown in FIG. 8. These registers are configured from D-type flip-flops, and the output terminal Q of each of flip-flops 640*a*, 640*b*, and 640*c* are set to active low by the signals /AMDINT0, -1 and -2 output by first decoder 631 by the read operation of the above registers from electronic control device 2, resulting in the output of the interrupt signals /INT0, -1 and -2. The slash (/) affixed to the front of signal names indicates that that signal is low active (same below). The registers that clear the outputs of these flip-flops 640*a*, 640*b* and 640*c* are assigned, as shown in FIG. 6, to prescribed addresses as three read-only registers (AMDCLR0, -1, -2). Therefore, when reading of each of the addresses assigned to these registers is performed by microprocessor 601, second decoder 632 outputs each of the signals /INTCLR0, -1 and -2, and the corresponding flip-flops are preset.

When an interrupt originates from electronic control device 501, one register in interrupt request register 640 must be accessed. Microprocessor 601 determines a priority and performs the processing that applies to the interrupt request. In this case, microprocessor 601 clears the corresponding interrupt request registers 640*a*, 640*b*, and 640*c*.

Polling command register 643 is a register that passes commands from microprocessor 601 to electronic control device 2 and can be written to by microprocessor 601 and read from by electronic control device 2. An exemplary hardware configuration for register 643 is shown in FIG. 8. As indicated in FIG. 9, polling command register 643 uses two octal D-type flip-flops, 643*a* and 643*b*, which form a 16-bit wide data latch, and one D-type flip-flop, 643*c*.

A 16-bit wide data bus DB29 originating from microprocessor 601 is connected to data input pins 1D through 8D of octal data flip-flops 643*a* and 643*b*. A 16-bit data bus DB68 originating from electronic control device 2 is connected to the octal output pins, 1Q through 8Q. Second decoder 632 outputs a signal /MCONTCS when microprocessor 601 accesses polling command register 643 (FIG. 6, register CONTCS), which is input to clock pins CK of flip-flops 643*a* and 643*b*. When the rising leading edge of this signal occurs, the contents of data bus DB29 are latched to flip-flops 643*a* and 643*b*. In addition, first decoder 631 outputs a signal /POLL when electronic control device 2 accesses polling command register 643 (FIG. 5, register POLL), which is connected to output enable pins OE, which enables the outputs of flip-flops 643*a* and 643*b*. When this signal goes low, data retained in flip-flops 643*a* and 643*b* is output to data bus DB68.

The /MCONTCS and /POLL signals are connected to a clock pin C and preset pin PR of D-type flip-flop 643*c*. Flip-flop 643*c* generates a signal CMDRD on its output pin Q which is set high when DB29 data is latched in flip-flops 643*a* and 643*b* (signal /MCONTCS is low) and reset low when this data is read from electronic control device 2 (signal /POLL is low). A read enabled status register 645 connected to electronic control circuit 2 uses a specific bit d3 (also called flag CMDRD below) to determine the status of the CMDRD signal. Therefore, by reading status register 645, electronic control circuit 2 is able to know or is provided with an indication from microprocessor 601 that the command code has been set in polling command register 643.

When electronic control circuit 2 looks at flag CMDRD, bit d3 of status register 645, and finds that a command has been placed in register 643, it reads the contents of polling command register 643 during a normal read cycle. That is, it reads the command sent from microprocessor 601. The commands are, for instance, to start transferring print data to data transfer controller 603, to start printing, or to display messages on console 518. As shown in FIG. 24, when electronic control circuit 2 reads the contents of polling register 643, CMDRD, output by flip-flop 643c, its output is then reset to a high level using the /POLL signal. Therefore, by observing a bit d2 of transfer flag register 647, microprocessor 601 is able to know whether or not the command it output was read by electronic control circuit 2.

In addition to the data described above, which shows whether or not a command has been placed in the register by microprocessor 601, status register 645 also retains the data illustrated in FIG. 10, which is described as follows. Bit d0 of this data is set low by signal EWRDY, which is generated within read control circuit 620 when data is written by electronic control circuit 2 to read control circuit 620, discussed later. When that data is read by microprocessor 601, bit d0 is set high by a signal from a second decoder 632. This bit is generally referred to as the EWRDY flag or flag EWRDY.

Data bits d1 and d2 indicate whether double bank control circuit 624 has its access enabled either by electronic control circuit 2 or microprocessor 601. The respective flags are called ADDMUXA and ADDMUXB. These two bits correspond to the two transfer banks built into double bank control circuit 624. As shown in FIG. 6, bits d1 and d2 are set and reset by microprocessor 601 when writing data to bit d0 of registers ADDMUXA and ADDMUXB, which are contained in control circuit 650. Therefore, before writing data to one of the banks of double bank control circuit 624, microprocessor 601 sets the flag to a low level and then resets it high after writing is finished. Assuming electronic control circuit 2 reads data from the bank side in which this flag is set high, by alternately writing and reading the data to the two banks, microprocessor 601 connects to the electronic control circuit 2 side and passes data. The function of the d3 bit (flag CMDRD) has already been described above.

Bit d5 acts as a flag CLKDIV, which is set according to the operation of the microprocessor 601 clock. Clock CLK, Which is output from first oscillator 661 and typically employs an external liquid crystal vibrator CRC1, is used as the operating frequency for microprocessor 601. If a value of zero is written to bit d0 of a register CLKDIV of control register 650 from microprocessor 601, the microprocessor clock is set to operate at 25 MHz. However, if a one is written to bit d0, the clock is set to operate at one-half of this frequency or 12.5 MHz. Flag CLKDIV of status register 645, when viewed from the point of view of electronic control circuit 2, is set low when clock CLK is operating at a frequency of 25 MHz and set high when this changes to 12.5 MHz. Electronic control circuit 2 checks this bit in status register 645 when the clock frequency is to be determined, that is, to know the current operating speed of microprocessor 601 in order to match the timing of data transfers, etc.

Bit d6 is the flag ADMON, which is set to high level when the microprocessor 601 is operating and to low level when it enters the sleep mode. In this embodiment, the microprocessor 601 performs processing that receives the page description language from electronic control device 2 and develops it into image data, and therefore when a prescribed amount of time has elapsed during which no page description language to be processed is sent from the electronic control device 2, microprocessor 601 reduces its initial operating frequency by one half to 12.5 MHz in order to reduce power consumption, and after more time has elapsed, it stops its own operation and enters the so-called "sleep mode." At this time, microprocessor 601 writes level 0 to register ADMON of control registers 650. As a result, this bit d6 of status registers 645 becomes low level as seen from electronic control device 2, and by checking this bit, electronic control device 2 can know the operating mode of microprocessor 601.

This time is measured using the real-time clock built into data transfer controller 603. The clock RCLK for this real-time clock is a clock from second oscillator 667 configured using an externally attached liquid crystal vibrator 665. The real-time clock is disposed inside bus controller 635, and it receives instructions from microprocessor 601 to measure the elapse of prescribed time periods. The reason why two sets of liquid crystal vibrators and oscillators are employed is to make it possible to change the operating clock CLK of the microprocessor 601 independently of the operating clock RCLK of the real-time clock.

The real-time clock sets the d1 bit of registers RTCVAL and RTCSEL, which belong to control registers 650, to low or high, and it is capable of specifying four interval timers, which it can start by writing level 1 to the prescribed bit d0 of the register RTCON. A timer that has been started outputs an interrupt request signal to microprocessor 601 at prescribed intervals until level 0 is written to bit d0 of register RTCON and it is stopped. When the microprocessor 601 receives this interrupt request signal, it reads register RTC-CLR and clears the interrupt request. The outputs of these interval timers are used for counting user time, etc., in the processing of the page description language.

Next is an explanation of the configuration of PROM control registers 649. PROM control registers 649 include the three registers EEPCS, EEPSK and EEPDI shown in FIG. 6, but these registers are memory built into cartridge 3 and are used to exchange data with the EEPROM 670, which is capable of electrical erasure and rewriting of data.

Cartridge 3 of this embodiment stores the various variables (configuration) required for operation of the laser printer 1 in the EEPROM 670. EEPROM 670 is one that reads, erases and writes data by serial transfer, and in this embodiment National Semiconductor's NMC93C66X3 is used. EEPROM 670 has a storage capacity of 16 bits× 256 bytes (number of registers) and is capable of reading, erasing or writing the contents of any specified register. When EEPROM 670 is set to a select condition by the chip select signal CS, the "0" and "1" data sent to the serial data input terminal Din are received in sync with the serial data clock SL, but the first three transferred bits of the data are interpreted as a command to the EEPROM, and the next 8 bits are interpreted as the register number where the data are to be read, erased or written. In the case of writing data, the data to be stored are supplied to the data input terminal Din in sync with the serial data clock SL following these command and register specifications.

The register EEPCS switches the chip select signal, and when the microprocessor 601 writes level 1 to bit d0 of this register, the EEPROM 670 goes to a select condition. Register EEPSK generates the serial data clock SK, and when the microprocessor 601 alternately writes level 0 and level 1 to this register, it generates the serial data clock for EEPROM 670. The register EEPDI holds the 1-bit data to be written to EEPROM 670, and microprocessor 601 rewrites register EEPSK and rewrites the prescribed bit d0 of register EEPDI in sync with the generation of the serial data clock SK according to the data to be written. The data output terminal Dout of EEPROM 670 is the prescribed bit d0 of transfer flag registers 647 explained above, and if the microprocessor 601 reads bit d0 of the transfer flag registers 647 in sync with the serial data clock SK after it outputs the data read command and the number of the register to be read to EEPROM 670, then it can read the contents of the specified register. Since the data stored in EEPROM 670 are retained even after the power is turned off, the contents of EEPROM 670 can be read immediately after the laser printer 1 is powered on again, thus making it possible to return the various settings, i.e., so-called configuration, of the laser printer 1 to the condition they were in immediately before powering off.

Some examples of the principal types and categories of information stored in EEPROM 670 were given above and are:

(A) Items regarding data the receiption by laser printer 1, such as:

Interface specifications (RS232C, RS422, specific LAN, parallel)

Specifications for serial communication (Full/half duplex, baud rate, stop bit, parity, data length, etc.)

(B) Items regarding printing, such as:

Number of copies

Selection of printing paper cassette (Upper/Lower, Manual insertion)

Printing of start page (Yes, No)

(C) Items regarding error modes

Print error description Yes, No

Handling of paper jams (Store image data of page on which paper jam occurred?).

(D) Items regarding software utilization

Name of printer (for identifying printers on LAN)

Passwords

Cache specification

Various types of timers

These data are stored in EEPROM 670, and CPU 510 of the electronic control device 2 reads what it requires from among this data and uses it as settings for data communications with workstation 7, to control laser engine 5, etc. These settings include those set by the console panel I/F 519 and those set according to information sent from workstation 7. This is described in greater detail below.

G. CONFIGURATION AND OPERATION OF READ CONTROL CIRCUIT 620

Next, an example configuration of read control circuit 620 and a data transfer procedure using read control circuit 620 are explained. Read control circuit 620 comprises two 8-bit first and second latches 651 and 652 in addition to, as shown in FIG. 11, a ROM 671 that outputs the data required for transfer, a three-input AND gate 672, and a D-type flip-flop 674 that generates the flag EWRDY (bit d0) of status registers 645. When read control circuit 620 is viewed from the electronic control device 2, these latches 651 and 652 correspond to the two registers EWWRL and EWWRH, which transfer data in 8-bit units as shown in FIG. 5. These registers are used to transfer the lower byte and upper byte, respectively, of the 16-bits/word data. First and second latches 651 and 652 correspond to the register EWRD shown in FIG. 6 when viewed from the microprocessor 601. That is, microprocessor 601 can read both latches 651 and 652 as one word via the data bus DB290.

ROM 671 of the read control circuit 620 stores 256 bytes of data; e.g., it can be realized with a fuse-type ROM, a low-capacity PROM, etc. Of course, it may also be realized using part of a large-capacity ROM, and the same function can be achieved when RAM is used by transferring the data in advance. The lower 8 bits (AC1 to AC8) of the address line from the connector address bus CAB are connected to the address terminals A0 to A7 of ROM 671, and the data terminals O0 to O7 are connected to the inputs 1D to 8D of first latch 651 and second latch 652. The outputs of ROM 671 are also output to FIFO control circuit 623 as the data bus Z0 to Z7 for the FIFO control circuit 623.

The outputs of first latch 651 and second latch 652 are connected to the data bus DB29, and these can be read by microprocessor 601 as the register EWRD. The output signal /EWROM of the three-input AND gate 672 is input to chip select CE and output-enable OE of the ROM 671, and when any one of the /EWWRH, /FIFOWR and /EWWRL signals input to three-input AND gate 672 becomes low active, this signal becomes active, at which time ROM 671 outputs the data at the address specified by the lower 8 bits of the connector address bus CAB.

The /EWWRH signal becomes low level when transfer of the upper byte is specified by the read control circuit 620, the /EWWRL signal goes low level when transfer of the lower byte is specified by same, and the /FIFOWR signal becomes low level when data transfer is specified by FIFO control circuit 623. Since the /EWWRL and /EWWRH signals are input to the clock terminals CK of first latch 651 and second latch 652, respectively, when these signals become active and data are output from ROM 671, these data are held in first latch 651 and second latch 652. Moreover, since the /EWWRL signal is input to the clock terminal C of flip-flop 674, the output Q of flip-flop 674 is inverted to low level when the lower byte is transferred. The output EWRDY is handled as bit d0 of the status registers 645 and bit d1 of transfer flag registers 647, i.e., flag EWRDY.

First latch 651 and second latch 652 are handled as register EWRD by microprocessor 601, and therefore when the microprocessor 601 goes to read the data held by the first latch 651 and the second latch 652, it performs a read operation on the register EWRD. At this time, the /EWRD signal becomes low active, and this signal outputs the previously held data to the output side of the first latch 651 and the second latch 652, i.e., to the data bus DB29, connected to the output-enable terminal. This /EWRD signal is connected to the preset terminal PR of flip-flop 674, and therefore the signal EWRDY, which is the Q output of flip-flop 674, is inverted to high level at the same time microprocessor 601 reads the data of first latch 651 and second latch 652. That is, the EWRDY flag, which is bit d0 of the status registers 645 and bit d1 of transfer flag registers 647, is set to level 1.

Assuming the above hardware configuration, electronic control device 2 and microprocessor 601 transfer data from the electronic control device 2 to microprocessor 601 according to the following procedure. The data to be transferred from electronic control device 2 to microprocessor 601 is print data the electronic control device 2 has received from workstation 7 and is the page description language program to be processed in microprocessor 601 of cartridge 3. Data transferred by read control circuit 620 is performed by the routine for handling data transfer to cartridge 3 executed by CPU 510 of electronic control device 2 (FIG. 12) and by data read interrupt handler routine executed by microprocessor 601 of the cartridge 3 (FIG. 14).

When the print data to be transferred to cartridge 3 are complete, CPU 510 initiates the processing shown in the flowchart in FIG. 12, whereby it first reads the flag EWRDY (bit d0) of the status registers 645 (step S700). Flag EWRDY becomes level 0 when data are set in first latch 651 and second latch 652 of read control circuit 620, and when those data are read by microprocessor 601, the flag is set to level 1, after which it is determined whether or not flag EWRDY has been set to level 1 in step S705.

CPU 510 stands by until flag EWRDY becomes level 1, and when it becomes level 1, CPU 510 performs processing that reads an addresses corresponding to [top address of area EWWRH+data D to be transferred×2] in step S710. When reading of the area EWWRH is performed, the data are output from ROM 671. As shown in FIG. 13, the 256 data at the even-numbered addresses from 00h to FFh from the top address EWWRH are written in order to ROM 671. The reason why data are not positioned at odd-numbered addresses is basically because data access by CPU 510 is performed in single words (16 bits) and because word units cannot be accessed beginning from odd-numbered addresses (results in address bus error). When an address separated from the top of the area EWWRH by D×2 is read, the data D from ROM 671 are read and latched in the second latch 652 as shown in FIG. 11.

When transfer (second latch 652 holds data) of the upper byte of the data to be transferred is performed in this manner, CPU 510 performs transfer of the lower byte (first latch 651 holds data) in the same manner in step S715. Assuming one word of data is being held by the first and second latches 651 and 652 as a result of the above processing, CPU 510 performs processing that sets one interrupt request register (AMDINTO in this embodiment; step S720).

CPU 510 then repeatedly executes the transfer handler routine shown in FIG. 12, but when data are held by first latch 651, the flag EWRDY is set to low level as shown in FIG. 11, and, therefore, the next data transfer is not processed until flag EWRDY becomes high level (level 1; steps S700, S705).

When CPU 510 sets interrupt request register (AMDINTO), microprocessor 601 receives this interrupt request and initiates the data read interrupt processing routine shown in FIG. 14. This processing is initiated immediately after data are held in first and second latches 651 and 652 in read control circuit 620, and microprocessor 601 reads the one word of data prepared by electronic control device 2 by reading register EWRD in step S730. Next, microprocessor 601 transfers the data it just read to a prescribed area in RAMs 611 to 614 in step S735.

By means of the processing described above, electronic control device 2 is capable of transferring data to cartridge 3, which is connected by no more than the read-only line data bus CDB. Moreover, since data are written in byte units and are read in word units, microprocessor 601 takes in data with great efficiency. This explanation covers the transfer of one word of data, but data do not have to be transferred in word units and can be transferred in byte units. In that case, only transfer that uses the area EWWRL is performed and the upper eight bits of data can be discarded by microprocessor 601.

H. CONFIGURATION AND OPERATION OF FIFO CONTROL CIRCUIT 623

FIFO control circuit 623 is equipped with the latch 657 that latches the data to be written to a FIFO memory 621, a FIFO write registers 653 that control the writing of data to FIFO memory 621, and FIFO read registers 655 that control reading data from the FIFO memory. FIFO memory 621 can hold 1024 bytes of data and is equipped internally with an address counter for writing and a counter for reading. FIFO memory 621 also has a write reset terminal and a read reset terminal for resetting these respective counters, an 8-bit data bus on the write side, an 8-bit data bus on the read side, a clock terminal for writing and a clock terminal for reading.

By utilizing this type of FIFO memory 621, CPU 510 in electronic control device 2 can use the FIFO control circuit 623 to transfer data to microprocessor 601. Data transfer using read control circuit 620 is performed on a byte or word unit basis, whereby each time one byte or one word of data is transferred, an interrupt request signal is output to the microprocessor 601 to notify it of the transfer, while data transfer using FIFO control circuit 623 utilizes the function of FIFO memory 621 to combine multiple bytes for transfer. In order to transfer data from the electronic control device 2 to microprocessor 601, CPU 510 of electronic control device 2 executes the transfer processing routine shown in FIG. 15 and microprocessor 601 of cartridge 3 executes the processing routine shown in FIG. 16. First is an explanation of the processing routine shown in the flowchart in FIG. 15.

When CPU 510 of electronic control device 2 performs data transfer using the FIFO control circuit 623, it first prepares the prescribed number of bytes of data to be transferred.

When CPU 510 of the electronic control device 2 initiates the data transfer processor routine shown in FIG. 15, first the register FIFORST belonging to FIFO write circuit 654 of the FIFO control circuit 623 is read and the address counter on the write side is reset (step S750). Following this, the variable N is reset to 0 to count the number of data sent out (step S755). Next, the address [top address of register FIFOWR+data D to be transferred×2] is read (step S760). When this address is read, a prescribed address in ROM 671 is accessed as in the read control circuit 620 (see FIG. 13), the data D CPU 510 is transferring are output, and these data are latched in the latch 657 via the bus Z0 to Z7 shown in FIG. 11.

Next, the data D read from register FIFOREQ of the FIFO control circuit 623 and held in latch 657 are transferred to the FIFO memory 621 in step S765. When register FIFOREQ is read, the write clock is output to the clock terminal on the write side of the FIFO memory 621, and the data D held in latch 657 are written to the address indicated by the address counter on the write side of FIFO memory 621. At the same time, the contents of the address counter on the write side inside the FIFO memory 621 are incremented by 1. When one byte of data is written in this manner, the variable N, which indicates the number of data transferred, is incremented by 1 in step S770 and judgment is performed to determine whether or not the variable N equals the total number of bytes X to be transferred in step S775. Therefore, the processing in steps S760 to S775 above is repeated until the number of bytes N of data transferred equals the total number of bytes X.

When all data have been transferred, CPU 510 sets one of the interrupt request registers (AMDINT1) to notify the microprocessor 601 that the transfer of data is complete (step S780), after which the routine escapes to NEXT and is terminated.

Microprocessor 601, on the other hand, initiates the data receive interrupt routine shown in the flowchart in FIG. 16 when it receives this interrupt request AMDINT1. When this routine is initiated, microprocessor 601 first reads the register RDRST belonging to FIFO read registers 655 of FIFO control circuit 623 and resets the address counter on the read side of FIFO memory 621 (step S800). Next, the variable M for counting the number of received data is reset to 0 (step S805).

Following this, the register FIRCLK belonging to the FIFO read registers 655 is read in step S810, and the data that are read are transferred to a prescribed area in RAMs 611 to 614 in step S815. When the register FIRCLK is read, a read clock is output to the clock terminal on the read side of FIFO memory 621, and the data D at the address indicated by the address counter on the read side at that time are read out. At the same time, the contents of the address counter on the read side in FIFO memory 621 are incremented by 1.

When one byte of data is received, the variable M is incremented by 1 in step S820, and it is determined whether or not the variable M is equal to the total byte number X in step S825. Therefore, the processing in steps S810 to S825 above is repeated until the byte number M of the received data equals the total byte number X for the data.

When it is judged that all data have been received, microprocessor 610 writes a command to the polling command registers 643 that indicates the completion of the reading of data (step S830). CPU 510 of electronic control device 2 knows that data reception by FIFO control circuit 623 is complete by reading the contents of polling command registers 643. The next transmission can now be started. Microprocessor 601 then escapes to RTN and terminates this routine.

By means of the processing described above, large amounts of data can be efficiently transferred utilizing the FIFO control circuit 623. The transferred data are stored in a prescribed area in RAMs 611 to 614 of data transfer controller 603 and wait for processing by microprocessor 601.

I. CONFIGURATION AND OPERATION OF DOUBLE-BANK CONTROL CIRCUIT 624

The image data obtained upon completion of image development are then transferred to electronic control device 2, where they are stored in RAM 512 and printed by laser engine 5 according to a prescribed timing. These image data are transferred by the double-bank control circuit 624. Double-bank control circuit 624 transfers from microprocessor 601 to electronic control device 2 and is equipped with two banks that store 32 bytes (16 words) of data. These are referred to as A bank and B bank, and since the hardware of both is exactly the same, only the configuration of A bank is shown in FIG. 17.

The addresses and data buses of each of these banks are configured such that they can be switched from microprocessor 601 and from electronic control device 2, and as shown in the figure, they are configured from data selectors 681 and 682, which select the address line, four octal line buffers 684 to 687, which are used in two sets of two each and select the data bus (16 bits wide), RAMs 691 and 692, which have a 32-byte storage capacity, OR gates 694 and 695, which make up the other gates, and an inverter 696. In FIG. 17, a configuration is shown in which two memory chips with a 32-byte storage capacity are used, but the memory can also be realized by switching the upper address of a single memory chip.

Data selector 68 is configured such that it selects the least significant four bits (AC1 to AC4) of the address bus CAB on the electronic control device 2 side and the lower four bits (A2 to A5) of the address bus AAB on microprocessor 601 side and outputs them, and selection of the address bus is performed by the signal ADDMUXA (bit d0 of register ADDMUXA) connected to the select terminal S. Data selector 682 switches the read-write signal for the RAMs 691 and 692 in addition to selecting the address bus, and in a similar manner, the signal ADDMUXA connected to the select terminal S determines which signals are connected to the chip select terminals CE1 and -2 and the output-enable terminal OE of RAMs 691 and 692 by switching them.

Octal line buffers 684 and 685 are tristate line buffers connected to the data bus DB29, and when the gate terminals 1G and 2G become low level, the data bus DB29 on the microprocessor 601 side and the data bus of RAMs 691 and 692 are connected, resulting in a condition that allows the microprocessor 601 to write data to RAMs 691 and 692. The output of OR gate 694, whose inputs are the signal /DPWROA and the signal /ADDMUXA, is connected to the gate terminals 1G and 2G of the octal line buffers 684 and 685. The signal /DPWROA becomes low level when the microprocessor 601 writes data to A bank. Therefore, by setting bit d0 of register ADDMUXA to low level in advance of writing data to A bank, when microprocessor 601 does write data to A bank, the gates of line buffers 684 and 685 open and the data output to data bus DB29 are output to data bus of RAMs 691 and 692, where they are written.

When the gate terminals 1G and 2G of line buffers 686 and 687 become low level, data bus DB68 on the electronic control device 2 side and the data bus of RAMs 691 and 692 are connected, resulting in a condition in which data can be read out from RAMs 691 and 692 to electronic control device 2. The output of OR gate 695, whose inputs are the signal /DPOE1A and the signal ADDMUXA inverted in the inverter 696, is connected to the gate terminals 1G and 2G of the octal line buffers 686 and 687. The signal /DPOE1A becomes low level when the data of A bank are read from the electronic control device 2 side. Therefore, by setting bit d0 of register ADDMUXA to high level in advance of reading the data of A bank, the gates of the octal line buffers 686 and 687 open and the data output to the data bus of RAMs 691 and 692 are output to the data bus DB68 when electronic control device 2 performs a read operation on A bank.

The transfer processing of image data performed by microprocessor 601 and its receiving processing performed by CPU 510 of the electronic control device 2 are explained below assuming this hardware. FIG. 18 is a flowchart showing the transfer start processor routine for image data executed by the microprocessor 601. As shown in the figure, microprocessor 601 sets a transfer start command in polling command registers 643 before transferring image data in step S850.

CPU 510 of electronic control device 2 reads the command in polling command register 643 and executes the response processing routine shown in FIG. 19. That is, electronic control device 2 judges whether or not the laser printer 1 is in a print-enabled condition (step S860), and if it judges that it is in a condition that will allow printing, then it sets one (AMDINT2) of the interrupt request registers (step S865), escapes to NEXT and temporarily terminates the routine. If the printer is not in a condition that will allow printing, then CPU 510 performs processing that notifies microprocessor 601 of cartridge 3 in step S870. A condition that will not allow printing is one in which laser engine 5 has not completely warmed up yet, or there is a paper jam or other condition that will not allow printing even though the image data have been received.

When the interrupt request signal AMDINT2 is received from electronic control device 2, the microprocessor 601 initiates the image data transfer interrupt processing routine shown in FIG. 20. When this processing is activated, the microprocessor 601 first writes level 1 to bit d0 of register ADDMUXA (step S900). When bit d0 of register ADDMUXA is level 1, the data bus of RAMs 691 and 692, which make up A bank, is connected to the data bus DB29 on microprocessor 601 side as was explained using FIG. 17, thus disabling access from electronic control device 2.

Next, microprocessor 601 transfers 16 words (32 bytes) of data to A bank DPWROA (step S902). When data are written to A bank DPWROA, the signal /DPWROA shown in FIG. 17 becomes low level, and the data are written to RAMs 691 and 692 via the octal line buffers 684 and 685. Upon completion of transfer of the 16 words of data, the microprocessor 601 writes level 1 to bit d0 of register ADDMUXA (step S904), and data bus of RAMs 691 and 692, which make up A bank, is connected to data bus DB68 of the electronic control device 2.

Microprocessor 601 then writes command data to polling command registers 643 to notify that transfer to A bank is complete (step S906). This completes transfer of data to A bank, and the microprocessor 601 then executes the same processing as above with respect to B bank in step S910. When data transfer to B bank is complete, microprocessor 601 writes command data to the polling command registers 643 that notify in the same way that transfer is complete. In this way, the transfer of a total of 32 words (64 bytes) of data to A and B banks from cartridge 3 is completed.

In response to the above processing performed by microprocessor 601, CPU 510 executes the image data receive processing routine shown in FIG. 21. That is, CPU 510 first reads bit d3 of the status registers 645, i.e., flag CMDRD, (step S920) and judges whether or not it is at level 0 (step S925). When command data are written to the polling command registers 643 by the microprocessor 601, the flag CMDRD is set to level 0, and therefore CPU 510 reads the command data in the polling command registers 643 (step S930).

CPU 510 checks the command data just read and judges if it is command data that indicates that data transfer to A bank is complete (step S935), and if it is not, then CPU 510 executes other processing (step S940). When the command data in the polling command registers 643 indicate that data transfer to A bank is complete, the electronic control device 2 reads the 16 words in A bank DPRAMA (step S945; see FIG. 5) and transfers the data that have been read to RAM 512 (step S950).

Since the above processing completes the reading of the 16 words of data in A bank, the electronic control device 2 sets one interrupt request register (AMDINT2) that will allow transfer of the next 16 words from the microprocessor 601. The processing in steps S920 to S955 is then executed with respect to B bank. That is, when it is judged that the transfer of data by the microprocessor 601 to B bank has been completed based on the command data in the polling command registers 643, then one interrupt request register is set to send an interrupt request to the microprocessor 601 after the 16 words of data in B bank DPRAMB are read and transferred to RAM 512.

When it receives the interrupt request, the microprocessor 601 executes the interrupt processing routine shown in FIG. 21 again, and therefore the microprocessor 601 and CPU 510 complete the transfer of all image data by executing both routines (FIG. 20 and FIG. 21). If new print data are not received from the electronic control device 2 after all image data have been transferred, then the microprocessor 601 writes level 1 to register CLKDIV of the control registers 650 after a prescribed time period has elapsed and cuts its own operating frequency by half to 12.5 MHz to reduce power consumption and reduce the amount of heat generated.

J. PRINTING OF IMAGE DATA

Electronic control device 2, which receives the transfer of all image data, prints the image data by exchanging signals with laser engine 5 using the double-buffer circuit 520 and register 517 explained above. The exchange of signals between electronic control device 2 and laser engine 5 is roughly depicted in FIG. 22. Printing is summarized below referring to this figure.

When the image data that have been developed are received from cartridge 3, the electronic control device 2 inquires whether or not laser engine 5 is in a print-enabled condition, and if it does judge that warming up, etc., are complete and the laser engine 5 is in a print-enabled condition, then it outputs the print signals shown in FIG. 22 to laser engine 5 via the register 517. When laser engine 5 receives these signals, it immediately starts the motor for paper transport. Rotation of the photosensitive drum, charging processing, etc., are started in sync with this.

When the paper to be printed on reaches a position at a prescribed distance from the photosensitive drum, the laser engine 5 detects the leading edge of the paper and outputs the signal VREQ to the electronic control device 2 via register 517. When the electronic control device 2 receives this signal VREQ, it waits a prescribed period of time; i.e., the time required for the photosensitive drum to rotate to the position where formation of the latent image by the laser beam begins, and outputs the signal VSYNC via the register 517. When the laser engine 5 receives this signal VSYNC, it outputs the laser beam horizontal sync signal HSYNC via the register 517. Since this signal HSYNC is equivalent to a signal that instructs to begin reading one line of image data, the laser engine 5 reads image data from either RAM 520A or RAM 520B of the double-buffer circuit 520 in sync with this signal. When there is a top margin, control is performed that ignores the signal VSYNC for the number of lines corresponding to the top margin. This control is the same when a bottom margin is formed.

At the same time, CPU 510 counts this signal and transfers the necessary image data to RAM 520A or RAM 520B of the double-buffer circuit 520. When a prescribed amount of time has elapsed or the count of the horizontal sync signal becomes equal to a value previously set to conform with the paper size after the laser engine 5 detects the trailing edge of the paper, CPU 510 terminates the transfer of image data to the double-buffer circuit 520. By means of the above processing, one page of image data is transferred to the laser engine 5 and the image is printed on the paper.

K. GENERAL PROCESSING AND SETTING CHANGES

The configuration and operation of each section of the printing system and cartridge are detailed above. A description of the general printing process steps executed by both electronic control device 2 and cartridge 3 are explained below in relation to FIG. 23 and FIG. 24. FIG. 23 illustrates a flowchart of the main processing routine or steps executed in laser printer 1, i.e., electronic control device 2, and FIG. 24 presents a flowchart of the main processing routine or steps executed by cartridge 3.

When power is turned on or otherwise connected to electronic control device 2, it checks the contents of ROM 511 or the function of the RAM 512 in a step S1000. ROM 511 is checked generating or computing a checksum for stored data and comparing the results with a value prestored in ROM 511. RAM 512 is checked by reading predetermined or prescribed stored data and confirming it. In addition to ROM 511 and RAM 512, the console panel I/F 519, etc., can also be checked using various known techniques.

When the power is turned on or the system otherwise initialized, microprocessor 601 of cartridge 3 performs initialization before any other processing is executed. That is, as shown in FIG. 24, the microprocessor also checks ROMs 606 to 609 and RAMs 611 to 614 in step S1100, after which it reads settings stored in EEPROM 670, and develops or transforms the settings within a prescribed area of RAM 611 in step S1110. The settings read from EEPROM 670 can be communication parameters, the number of copies to be printed or other settings from a previous printing operation or session.

As seen in FIG. 28, CPU 510 of electronic control device 2 reads the settings that microprocessor 601 has retrieved from EEPROM 670 and developed in RAM 611 from cartridge 3, and stores them in RAM 512 of electronic control device 2 in step S1010 FIG. 28. Reading data from cartridge 3 by electronic control device 2 is performed using double-bank control circuit 624 described above. Electronic control device 2, which has read these settings, uses the settings for data input port 514, etc. Once the above initialization steps are completed, electronic control device 2 waits for data to be transferred from workstation 7.

When print data arrives from workstation 7, electronic control device 2 receives them via data input port 514 in a step S1020. Since the settings necessary for data transfer have already been made at this time, electronic control device 2 can receive the data with no problem. Electronic control device 2 then performs processing necessary to transfer this print data to cartridge 3 utilizing FIFO control circuit 623 in step S1030. The configuration for transferring large amounts of data utilizing the FIFO control circuit 623 has already been described.

When print data are received by cartridge 3 via FIFO control circuit 623, as in step S1120 of FIG. 24, processing is performed that develops image data using this print data. The developed image data are stored as a bit image in a prescribed area in RAMs 611 to 614, which were also described above. Once the entire, or appropriate portion of the, image is prepared in electronic control device 2, the developed data are immediately transferred to electronic control device 2 via double-bank control circuit 624 in a step S1140.

Electronic control device 2 receives image data from cartridge 3 in step S1040, and transfers this data to laser engine 5 where it is printed in step S1050. The previously made settings are used for the number of copies, etc. at this time. Transfer of the image data using double-bank control circuit 624 and printing using double-buffer circuit 520 in laser printer 1 have already been explained in detail above.

After CPU 510 performs the above processing steps, it is determined whether or not there is subsequent print data, i.e., sent from the workstation 7, and if there is subsequent print data, then the processing routine returns to step S1020 above and is repeated. Microprocessor 601 in cartridge 3 also determines whether or not there is subsequent print data after the image data have been transferred using notification from CPU 510, as in step S1150 of FIG. 24, and if there is subsequent print data, then the processing routine described above is repeated.

If there is no subsequent print data transferred from workstation 7, both CPU 510 in electronic control device 2 and microprocessor 601 in cartridge 3 proceed or "escape" to the END instruction or step and terminate the processing routine. In the above description, the transfer of print data and developing of image data were performed in sequence for the sake of convenience, but in cases in which print data are transferred from workstation 7 slowly, the receiving of print data and developing of image data are generally performed in parallel using interrupt routines.

The processing steps used to change the printer settings stored in EEPROM 670 are explained next in relation to the illustration of FIG. 25. CPU 510 of electronic control device 2 executes the setting change processing routine shown in FIG. 25 according to prescribed timing and determines whether or not a request for a setting change has been generated in step S1200. A request for a setting change is generated whenever it is determined, after power-up, whether or not cartridge 3 has been installed, when a prescribed operation is performed on console panel 518, or when there is an instruction from workstation 7 for a change, as instituted by software. Except for instructions regarding communications, a configuration should be adopted that will not accept instructions for changing settings from console panel 518 or from workstation 7 unless image development has been completed. Settings regarding image development cannot be changed during development of an image according to a prescribed page description language and the chosen configuration should prevent attempts to do so.

If no request for a changing a setting has been generated, then this processing routine is terminated without performing further steps. However, if a request has been generated, then the setting change is determined in a step S1210. Here, setting determination refers to those processing steps used to specify more precisely the nature of the change for a given setting. That is what items, such as communication parameters, for example, should be set to in accordance with operation procedures on console panel 518 or based on an analysis of a command received from workstation 7. In order to effectively utilize a limited number of control buttons or options when settings are made from console panel 518, an interface is often used wherein selections are displayed on a display panel and one of the items is selected by operation of a control button or cursor. The method used for determining settings and the concomitant results are established according to these specifications.

After determining the new or appropriate setting, electronic control device 2 transfers the new setting to cartridge 3 via read control circuit 620 in step S1220. When microprocessor 601 receives this data, it stores it in EEPROM 670 using the processing steps described above. CPU 510 then displays a message indicating the completion of the setting or setting change in a display panel of console panel 518 and terminates this processing routine. EEPROM 670 is typically configured as a type of PROM that stores data using serial transfer, and when data are transferred from electronic control device 2, the data previously developed in a prescribed area in RAM 611 are rewritten and the data are combined and rewritten according to predetermined timing. The data used for these settings can be rewritten each time a prescribed time period has elapsed, or after waiting for an instruction from console panel 518 to be rewritten. Furthermore, a battery may be provided in cartridge 3 so that the current settings can be rewritten immediately after power to laser printer 1 is terminated or immediately after cartridge 3 is removed from connector CN11 to provide later availability for recall and analysis.

This methods of changing settings may be directed to changing communication parameters or it may cover many other changes in the operating mode of, or parameters used in, laser printer 1. In the latter case, processing by a page description language in cartridge 3 may be terminated and alternative data or image processing selected using control commands specific to laser printer 1 or the opposite type of selection, printer to cartridge, may be performed.

L. EFFECTIVENESS OF A FIRST EMBODIMENT

By means of the embodiment described above, the settings that determine the various conditions for operation of laser printer 1 are stored in EEPROM 670 of cartridge 3, and, therefore, the operating conditions of laser printer 1 are easily changed to those suited to development of image data by cartridge 3 after installation of cartridge 3 in connector CN11. Moreover, since the contents of EEPROM 513 of electronic control device 2 are not rewritten, the operating conditions of laser printer 1 can be immediately returned to an original state when cartridge 3 is removed. Therefore, even in cases in which cartridge 3 is added to laser printer 1 changing its functionality, new processing configurations can be easily established and canceled. The number of copies used by laser engine 5 is normally stored, but even in cases in which printing is performed with cartridge 3 installed, this value rewrites data in EEPROM 513 when printing is performed with cartridge 3 installed. Of course, this value may also be stored in EEPROM 670 in cartridge 3. Further, it is not necessary to count the number of copies printed when cartridge 3 is installed.

In this embodiment, data can be transferred from electronic control device 2 to cartridge 3 utilizing a read-only data bus. Moreover, since the circuit that transfers data utilizing a read-only data bus is realized using an ASIC device, the circuit can be made more compact and less complex. Further, since both read control circuit 620 and FIFO control circuit 623 are employed to transport data from electronic control device 2 to data transfer controller 603, data can be transferred efficiently by using one or the other depending on the type of data to be transferred. Also, if one system should fail, the other system can be used to compensate.

Since electronic control device 2 uses an interrupt to provide notification of data transfer to cartridge 3, in this embodiment, microprocessor 601 of cartridge 3 need not continually monitor the operation of electronic control device 2, thus allowing it to be operated more efficiently.

M. OTHER ASPECTS OF THE INVENTION

In the above embodiment, changing settings accompanying installation of the cartridge was briefly explained for the three cases in which it was performed, based on instructions from console panel 518; based on instructions generated by software from the workstation 7; or immediately after powering on the printer when cartridge 3 is installed. In the first and second cases, the settings are changed with cartridge 3 installed. In the third case, however, the settings are changed depending on whether not cartridge 3 is inserted.

The methods for changing settings accompanying installation and removal of cartridge 3 may limit installation and removal of cartridge 3 to when the power to laser printer 1 is off, or may allow installation and removal with the power on. Considering that the potentials of laser printer 1 and cartridge 3 are typically in a floating condition, the former configuration is generally employed to assure reliability of electronic parts. However, if a configuration is employed that definitely causes the frame ground of cartridge 3 to come in contact with the frame ground of laser printer 1 before installation in connector CN11 when the cartridge is inserted in the installation opening, it is possible to insert or remove cartridge 3 while the power to laser printer 1 is on. In this case, the changing of settings can be performed with the installation and removal of cartridge 3.

As was explained in relation to FIG. 4, the /CTRGS signal, which is pulled down to low level when cartridge 3 is inserted, is output to connector CN11 connected to cartridge 3, and since this signal line is pulled up in electronic control device 2 of laser printer 1, CPU 510 can detect when cartridge 3 is installed in connector CN11. As shown in FIG. 26, a configuration can be employed for the actual circuit in which a chatter removal circuit 1300 and an edge detection circuit 1310 are provided after pullup resistor Rup provided in the signal line for the /CTRGS signal. /CTRGS signal is then used as the interrupt signal source for CPU 510. Edge detection circuit 1310 is provided to detect both installation and removal of cartridge 3.

When CPU 510 receives this interrupt signal, it refers to a prescribed address assigned to ROM 618 of cartridge 3, and when cartridge 3 is installed, it uses the appropriate settings stored in EEPROM 670, and when the cartridge is removed, it uses settings stored in EEPROM 513. If cartridge 3 is removed while receiving the transfer of data from workstation 7 or while image data are being developed in cartridge 3, data reliability is lost when any setting changes are instituted, and, therefore, it is practical to have CPU 510 perform processing equivalent to resetting at the time of power on. For this reason, a configuration can be employed in which the output of the above edge detection circuit 1310 is taken as a logical sum with the reset signal from the power-on reset circuit 1340 by the OR gate 1330, which is input to the reset terminal of CPU 510.

The embodiment explained above concerned the application of the invention to a printer, but application of the invention is not limited to printers; e.g., it can also be applied to word processors, personal computers and workstations. In recent years, in addition to expansion slots, many computer-related devices have the ability to accommodate cartridge-type expansion devices such as IC cards. By mounting the accessory control device of the invention in a word processor, personal computer, etc., equipped with an expansion slot, IC card, etc., a configuration is possible in which settings for processing in the main unit are stored in the accessory control device. This configuration would store the setup of word processors and personal computers, settings used for communication with external devices, etc., in the accessory control device.

Also in this embodiment, an EEPROM was used to store settings, but other configurations are possible in which a regular memory backed by a battery is used instead of EEPROM 513 and EEPROM 670. A setting memory element equivalent to EEPROM 670 can be provided as expansion memory. Further, in this embodiment, the contents of EEPROM 513 were stored as the various settings in EEPROM 670, but a configuration is possible in which the settings in EEPROM 513 are temporarily read to RAM 611 in cartridge 3 and the settings in EEPROM 670 are transferred to EEPROM 513 when cartridge 3 is installed. The stored contents of EEPROM 513 can be returned to EEPROM 513 before cartridge 3 is removed. A switch can be provided on cartridge 3 and used to notify microprocessor 601 whether or not cartridge 3 will be removed, or microprocessor 601 can determine that the cartridge may be removed when data to be processed by microprocessor 601 are not received for a prescribed period of time, at which time it restores desired settings. A configuration is also possible in which instructions are given from the console panel 518.

The invention is not limited by the embodiments described above; e.g., a configuration in which the cartridge, with built-in outline fonts, receives the character point size and other data from the printer, generates a bit image at the specified point size and transfers it to the printer, a configuration in which the data received from the electronic device do not undergo particularly complex processing in the accessory control device but rather are simply stored or displayed, a configuration in which the main printer unit is an ink jet printer, and other configurations are possible as long as they do not deviate from the essential points of the invention.

The invention can be applied to all types of devices that employ a processor, e.g., printers, electrical equipment for vehicles, facsimile machines, telephones, electronic pocketbooks, electronic musical instruments, electronic cameras, translating machines, handy copiers, cash dispensers, remote controllers, calculators and any other information processing device to which an accessory control device can be connected via a connector.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An accessory control device for detachable connection to an electronic apparatus having a first processor capable of predefined logic operations and connected to a writable first setting memory means that stores at least first settings for use by the first processor, the accessory control device being used to alter the operations of the electronic apparatus, comprising:

procedure memory means for storing procedures for execution by the first processor;

second setting memory means for storing at least second settings for use by the first processor, said second setting memory means being configured to be selectively writable as desired;

means for writing the second settings into said second setting memory means when the accessory control device is connected to the electronic apparatus;

detection means for detecting whether the accessory control device is detached from or connected to the electronic apparatus;

switching means responsive to said detection means for controlling the first processor to use the first settings when the accessory control device is detached from the electronic apparatus; and for controlling the first processor to use the second settings when the accessory control device is connected to the electronic apparatus; and a second processor that executes logic processing independent of the first processor, wherein:

said procedure memory means is configured to further store procedures executed by the second processor;

said second setting memory means further stores settings for use by the second processor; and the second setting memory means comprises:
a semiconductor memory that stores data electrically; and
a power source for supplying electrical power to the semiconductor memory for retaining said second settings when the accessory control device is detached from the electronic apparatus.

2. The accessory control device of claim 1 wherein the second settings include conditions for communication by the electronic device with an external device.

3. The accessory control device of claim 1 wherein the electronic apparatus comprises a printer, and said second settings include a printer setting.

4. The accessory control device of claim 3 wherein:

said procedure memory means stores at least processing steps which develop print data and generate image date in the first or second processor, and said second settings include a print data development setting.

5. The accessory control device of claim 1 wherein said second processor has a faster processing speed than the first processor.

6. The accessory control device of claim 1 further comprising a casing that houses a printed circuit board on which is mounted said second processor and is configured as a cartridge to facilitate detachable connection to the electronic apparatus.

7. The accessory control device of claim 1 further comprising:

data receiving means for receiving data from the electronic apparatus; and data output means for outputting results of processing of received data by said second processor to the electronic apparatus.

8. The accessory control device of claim 1 further comprising:

memory means for storing processing steps for execution by the first processor according to processing by said second processor, and execution means for executing the steps stored in said memory means in the first processor.

9. The accessory control device of claim 1 further comprising:

data receiving means for receiving data output from the electronic apparatus, and data output means for outputting results of processing of the received data by said second processor to the electronic apparatus.

10. The accessory control device of claim 9 further comprising:

memory means for storing processing steps for execution by the first processor according to processing by the second processor, and execution means for initiating first processor execution of the procedure stored in said memory means upon connection of the accessory control device to the electronic apparatus.

11. The accessory control device of claim 1 further comprising:

means for transferring said second settings from said second setting memory means to said first setting memory means upon connection of the accessory control device to the electronic apparatus.

12. The accessory control device of claim 1 further comprising:

means for transferring said first settings from said first setting memory means to said second setting memory means prior to detachment of the accessory control device from the electronic apparatus.

13. The accessory control device of claim 1 further comprising:

means for inputting new second settings; and means for writing said new second settings into said second setting memory means.

* * * * *